United States Patent [19]
Miya et al.

[11] 3,943,578
[45] Mar. 16, 1976

[54] METHOD AND APPARATUS FOR DEODORIZING THE DIPPING UP SYSTEM OF A LAVATORY

[75] Inventors: Masami Miya; Masao Nagasaki, both of Tokyo; Shuichi Harada, Asaka, all of Japan

[73] Assignee: Nepon Kabushiki Kaisha (Nepon Inc.), Tokyo, Japan

[22] Filed: Aug. 14, 1974

[21] Appl. No.: 497,352

[30] Foreign Application Priority Data

| Aug. 16, 1973 | Japan | 48-91335 |
|---|---|---|
| Dec. 27, 1973 | Japan | 48-144381 |
| Dec. 27, 1973 | Japan | 48-144382 |
| Sept. 19, 1973 | Japan | 48-108822[U] |
| Dec. 27, 1973 | Japan | 48-147594[U] |
| Dec. 27, 1973 | Japan | 48-147595[U] |
| Dec. 27, 1973 | Japan | 48-147596[U] |
| Dec. 27, 1973 | Japan | 48-147597[U] |
| Dec. 27, 1973 | Japan | 48-147598[U] |
| Dec. 27, 1973 | Japan | 48-147599[U] |
| Feb. 16, 1974 | Japan | 49-18150[U] |
| Feb. 16, 1974 | Japan | 49-18151[U] |
| Feb. 16, 1974 | Japan | 49-18152[U] |
| Feb. 16, 1974 | Japan | 49-18153[U] |

[52] U.S. Cl. ............................ 4/128; 4/142
[51] Int. Cl.² ............................ A47K 11/02
[58] Field of Search ....... 4/111, 128, 129, 130, 108, 4/76, 141, 110, 142, 138; 251/4; 137/614.13

[56] References Cited
UNITED STATES PATENTS

| 1,130,441 | 3/1915 | Somerville | 4/128 |
|---|---|---|---|
| 2,835,272 | 5/1958 | Taupin | 137/614.13 |

*Primary Examiner*—Robert I. Smith
*Attorney, Agent, or Firm*—Blum Moscovitz Friedman & Kaplan

[57] ABSTRACT

The apparatus comprises a throttle valve comprising an upper cylindrical resilient deformable membrane having an upper flange at the upper end thereof and a lower cylindrical resilient deformable membrane having a lower flange at the lower end thereof and connected at its upper end to the lower end of the upper cylindrical membrane by a central flange. The upper flange is secured to the upper wall portion of the outer wall of the apparatus and the lower flange is secured to the lower wall portion of the outer wall with either one of the upper and lower cylindrical membranes being twisted by 180° about its longitudinal axis so that the twisted membrane is closed. The upper end of the throttle valve is attached to the hole discharge of the lavatory bowl while the lower end is located above the excrement reservoir. The lower membrane is closed during the use by rotating the central flange to appropriate angular position so as to temporarily hold the faeces thereon while bad odor from the reservoir is prevented from rising therethrough. After use, the central flange is rotated so as to open the lower cylindrical membrane for discharging the faeces thereon into the reservoir while the upper cylindrical membrane is closed to prevent bad odor from rising into the lavatory room and prevent the faeces to be viewed by the user. After discharge of the faeces into the reservoir, the lower cylindrical membrane is closed by rotating the central flange to be ready for the next use. Various mechanisms for rotating the central flange is provided for facilitating the opening and closing of the cylindrical membranes.

13 Claims, 64 Drawing Figures

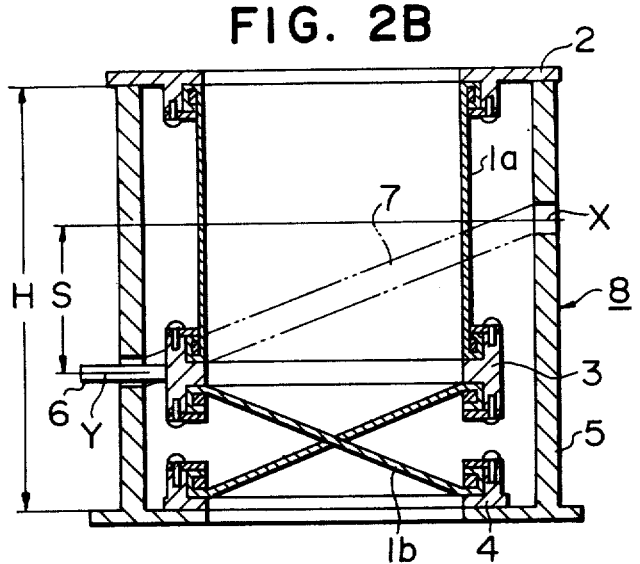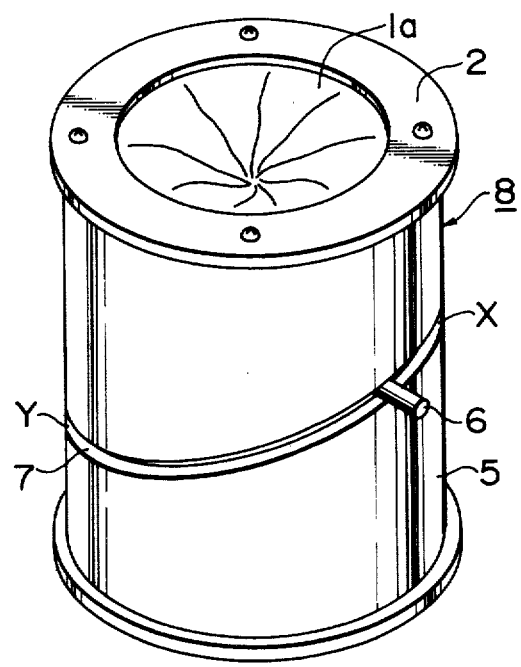

FIG. 4
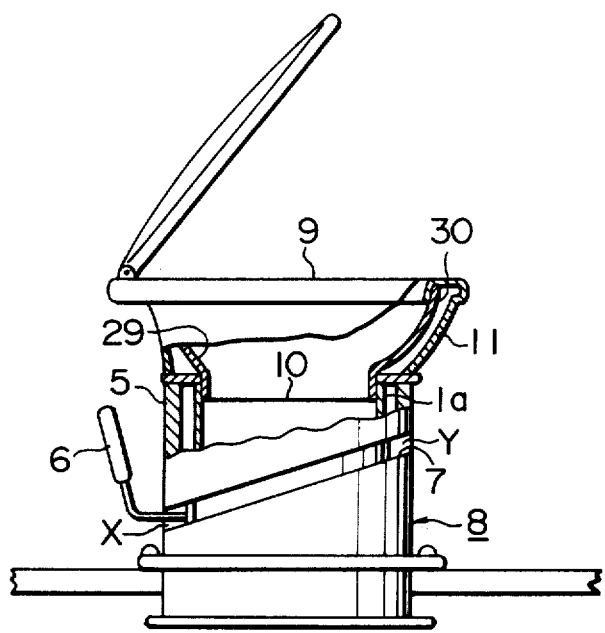
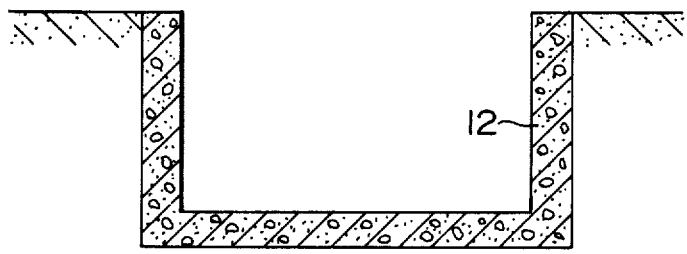

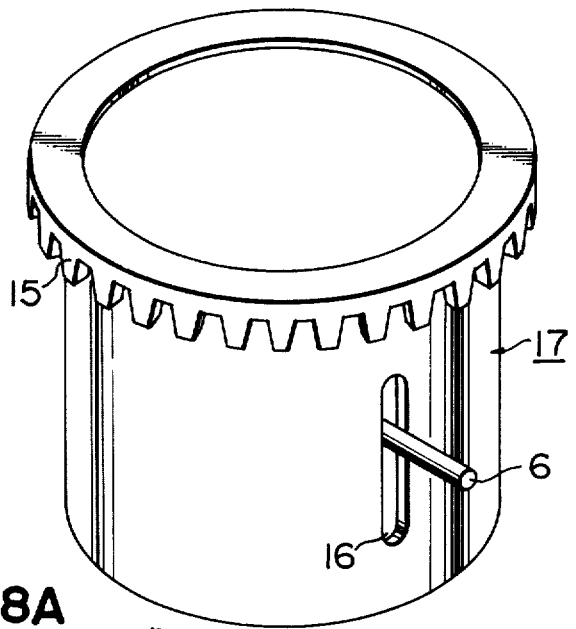
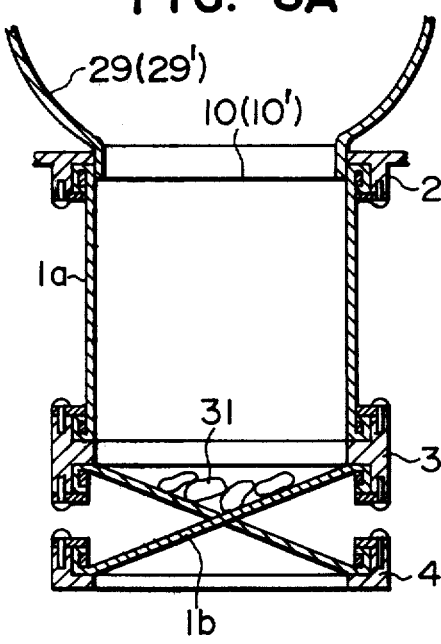
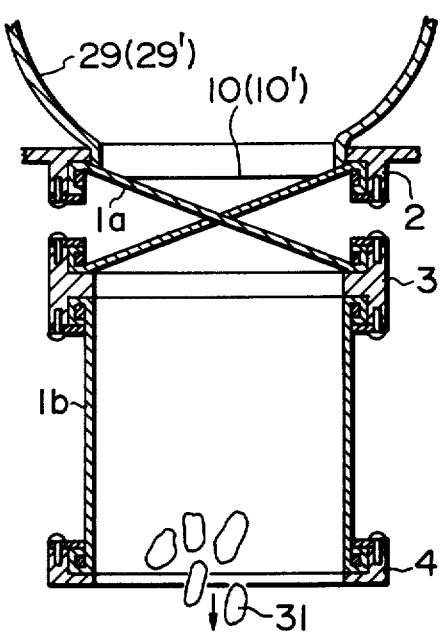

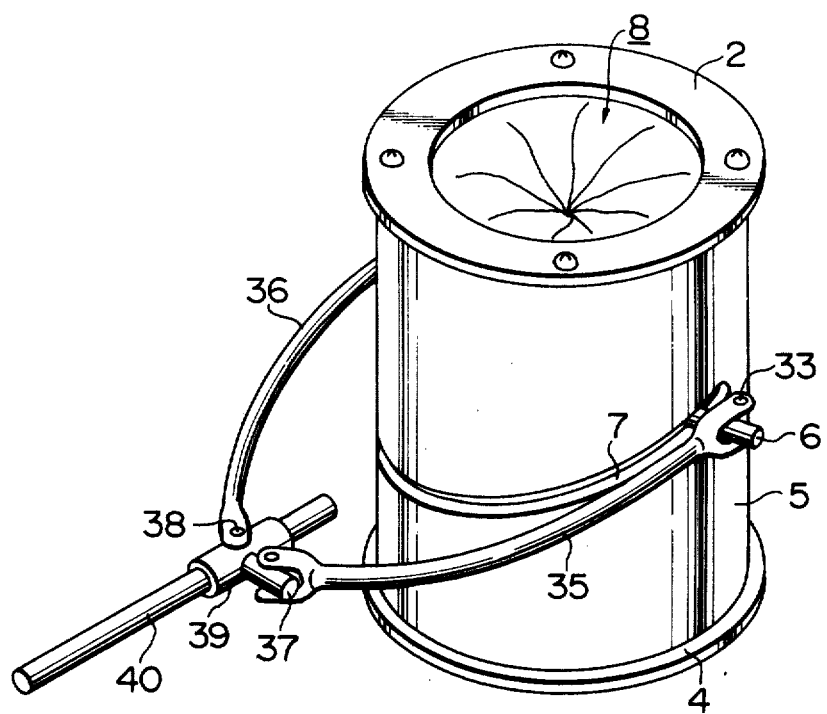

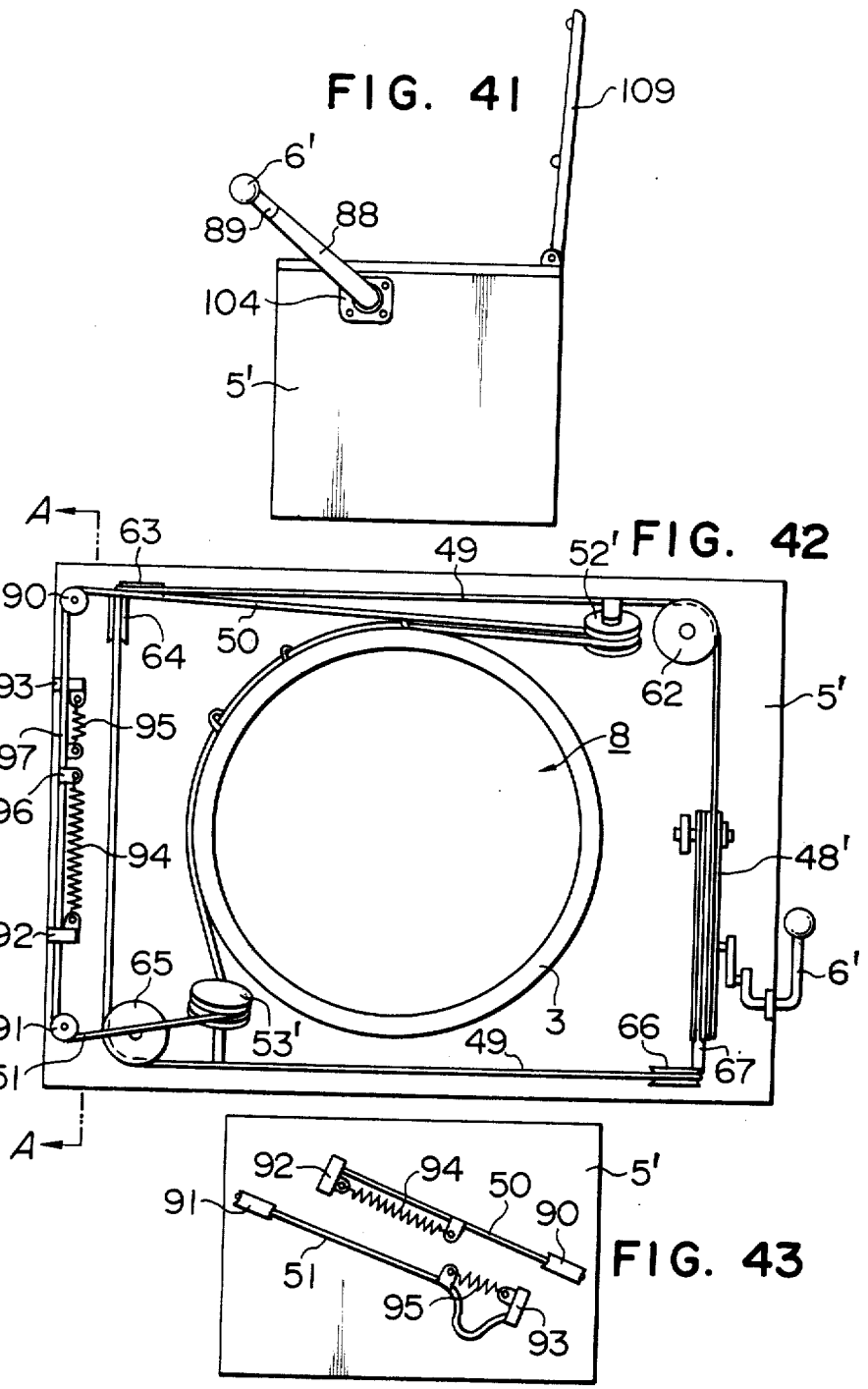

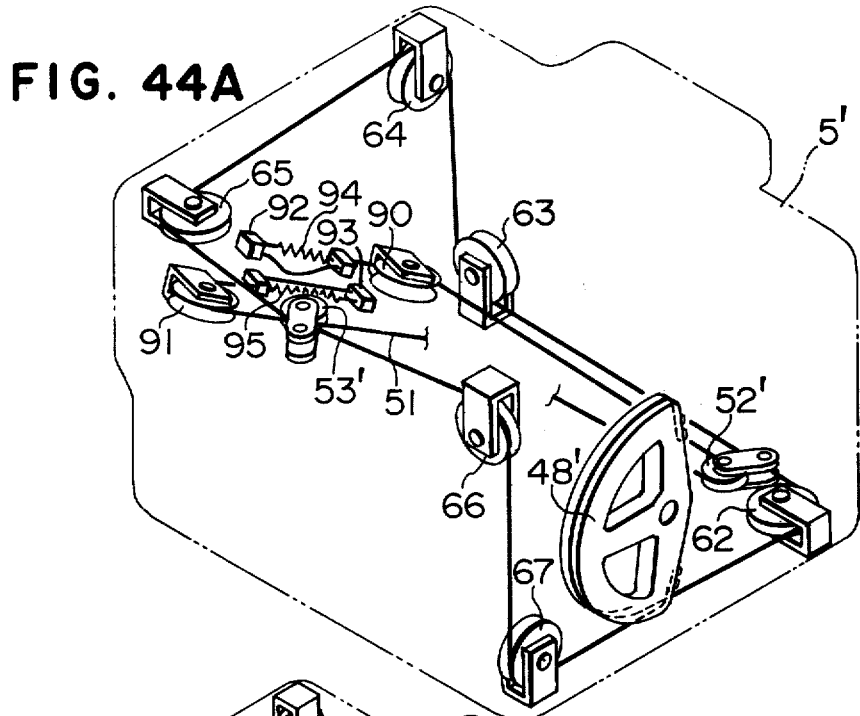
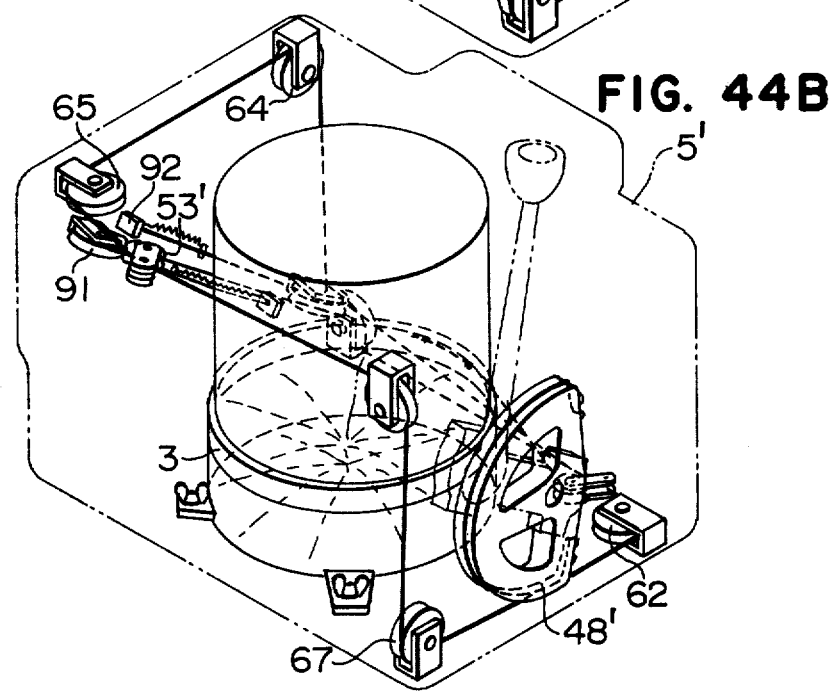

METHOD AND APPARATUS FOR DEODORIZING THE DIPPING UP SYSTEM OF A LAVATORY

BACKGROUND OF THE INVENTION

The present invention relates to a method and apparatus for deodorizing the dipping up system of a lavatory.

Heretofore, in order to prevent bad odor generated in an excrement reservoir of the dipping system from rising in the lavatory room, a method has been proposed in which the pipe for discharging the faeces is U-shaped so as to decrease the surface area of the faeces while bad odor existing between the upper surface of the faeces and the lavatory bowl is naturally or forcibly vented to the outdoor. In another method that has been previously proposed a surface active agent that foams is introduced into the lavatory bowl so as to lubricate and deodorize the bowl. In yet another method that has been proposed a small quantity of water is used for washing the lavatory bowl while bad odor is prevented from rising in the lavatory room by utilizing a slide valve or a ball valve.

However, in the method using a U-shaped discharging pipe, residual bad odor still remains in the lavatory room and the user of the lavatory bowl suffers from cold during the winter season while he feels unclean in that the faeces in the excrement reservoir or in the discharging pipe is fully exposed to view to the user by illumination of the lavatory room; and the possibility exists that the faeces may splash back to the user while using the lavatory bowl. In the method which employs a foaming surfactant in the lavatory bowl, the disadvantages described above are substantially eliminated, but this method requires a double construction of the lavatory bowl because an aqueous solution of the surface active agent must be stored in the lavatory bowl and, further, an air pump or an air feeding piping is required for feeding an appropriate amount of air into the surfactant in order to foam the solution of the surface active agent, thereby rendering the construction of the system complicated and the maintenance cost high. Moreover, special surface active agents are required.

Additionally, in the method which employs a small quantity of water for washing the lavatory bowl and a slide valve or a ball valve for deodorization, the size of the labatory bowl is small, because only a small quantity of water is used, and the user may become uneasy due to the small size of the lavatory bowl and the slide valve or the ball valve tends to be choked by papers and faeces while the deodorizing effect is incomplete and, further, a water supply mechanism is required, thereby making the device expensive.

The present invention aims at avoiding the above described disadvantages of the prior art methods and apparatus for deodorizing the dipping up system of a lavatory.

SUMMARY OF THE INVENTION

The principal object of the present invention is to provide a novel and useful method for deodorizing the dipping up system of a lavatory which avoids the above described disadvantages of the prior art methods and which is effective for deodorizing a lavatory.

Another object of the instant invention is to provide a novel and useful apparatus for carrying out the above described method of the present invention.

BRIEF DESCRIPTION OF THE DRAWINGS

FIGS. 2A and 2B are longitudinal sectional views showing in different positions the throttle valve of the present invention;

FIG. 3 is a perspective view showing the appearance of the throttle valve of FIGS. 2A and 2B;

FIG. 4 is a side view partly broken away showing the device of the present invention as applied to a Western style lavatory bowl;

FIG. 7 is a perspective view showing the relationship of the cylinder provided with downwardly directed face gear and the lever as applied to the Japanese style lavatory bowl;

FIGS. 8A and 8B are longitudinal sectional views showing, respectively, the different modes of operation of the deodorizing device of the present invention;

FIG. 9 is a perspective view showing another embodiment of the present invention;

FIG. 41 is a general side view showing the appearance of a further embodiment of the odorless lavatory device of the present invention;

FIG. 42 is a plan view showing the opening and closing device of a still further embodiment of the throttle valve of the present invention;

FIG. 43 is a view as seen in the direction of the arrow A—A in FIG. 42;

FIGS. 44A and 44B are perspective views schematically showing the mounting positions of the standing blocks and running blocks of the device of FIG. 42, respectively;

DETAILED DESCRIPTION OF THE PREFERRED EMBODIMENTS

Figure 1:
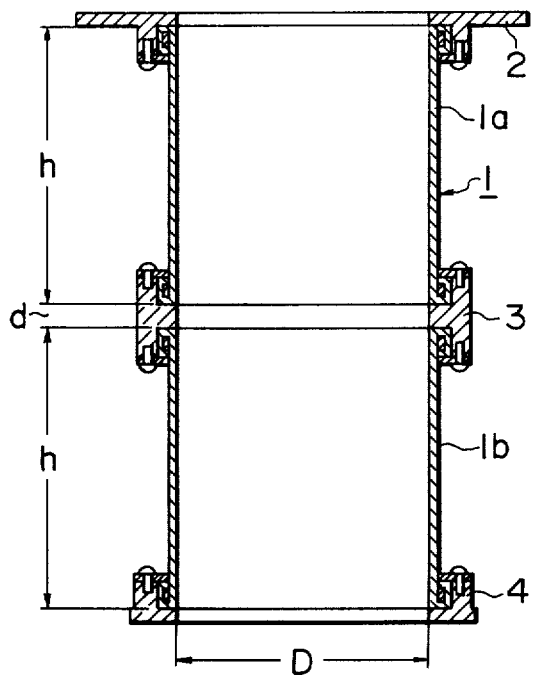
FIG. 1 is a longitudinal sectional view showing the inner cylinder of the throttle valve of the preferred embodiment of the present invention.

In FIG. 1, an inner cylinder 1 comprises an upper cylindrical membrane 1a and a lower cylindrical membrane 1b. The upper and lower cylindrical membranes 1a, 1b have the same innner diameter of the desired dimension as well as the same length of the desired dimension and are made of a resilient and tough material such as polytetrafluoroethylene and silicone rubber. An upper flange 2 is secured to the upper end of the upper membrane 1a and a lower flange 4 is secured to the lower end of the lower membrane 1b while a central flange 3 securely joins the lower end of the upper membrane 1a and the upper end of the lower membrane 1b together.

Figure 2A:
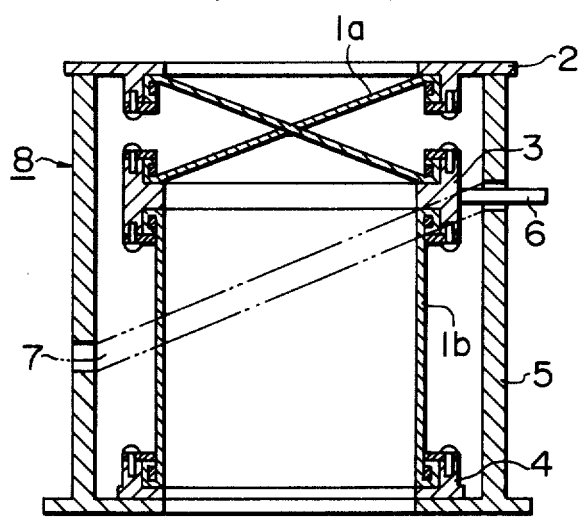

The inner cylinder 1 is inserted into an outer cylinder 5 with either one of the cylindrical membranes 1a, 1b being twisted about the longitudinal axes thereof by 180° while the other membrane is held in its non-twisted cylindrical shape, and the inner cylinder 1 is fixedly secured to the outer cylinder 5 by means of the upper flange 2 and the lower flange 4 as shown in FIGS. 2A and 2B. A lever 6 is attached to the outer periphery of the central flange and it extends through a helical slit 7 formed in the outer cylinder 5, the helical angle of the slit 7 being conformed with the rotational movement of the lever 6 occurring when either one of the cylindrical membranes 1a, 1b are twisted about the longitudinal axes thereof by 180°. It is noted that, when one of the membranes 1a or 1b is twisted by 180° about its longitudinal axis, it is completely closed as shown in FIGS. 2A and 2B, therefore, the assembly of the inner and outer cylinders 1, 5 constitutes a throttle valve 8.

Assuming that the inner diameter and the length of the upper and lower cylindrical membranes 1a, 1b are D and h, respectively, and the height of the central flange 3 is d, and the height of the outer cylinder 5 is H, while the vertical distance between the highest point X and the lowest point Y of the helical slit 7 is S, then the following relationships exist between the above described values:

$$H = (d + h) + \sqrt{h^2 - D^2}$$

$$S = h - \sqrt{h^2 - D^2}$$

Thus, when the upper cylindrical membrane 1a is twisted about its longitudinal axis by 180°, no substantial elongation takes place in the material of the upper cylindrical membrane 1a, resulting in the rotation of the central flange 3 while it is axially shifted upwardly following the sliding movement of the lever 6 along the slit 7.

In other words, the throttle valve 8 is so constructed that, when the lever 6 is in the highest point X of the slit 7, the upper cylindrical membrane 1a is closed while the lower cylindrical membrane 1b is held in its non-twisted cylindrical shape, whereas, as the lever 6 slidingly moves downwardly along the helical slit 7 toward the lowest point Y thereof while it is rotating about the longitudinal axis of the membranes 1a, 1b, the upper cylindrical membrane 1a is restored to its cylindrical shape and the lower cylindrical membrane 1b closes and, when the lever 6 reaches the lowest point Y of the slit 7, the upper cylindrical membrane 1a is completely opened or restored to its cylindrical shape and the lower cylindrical membrane 1b is completely closed.

During this operation, the material of the membranes 1a, 1b is twisted, but is not subjected to any substantial elongation.

Figure 5:
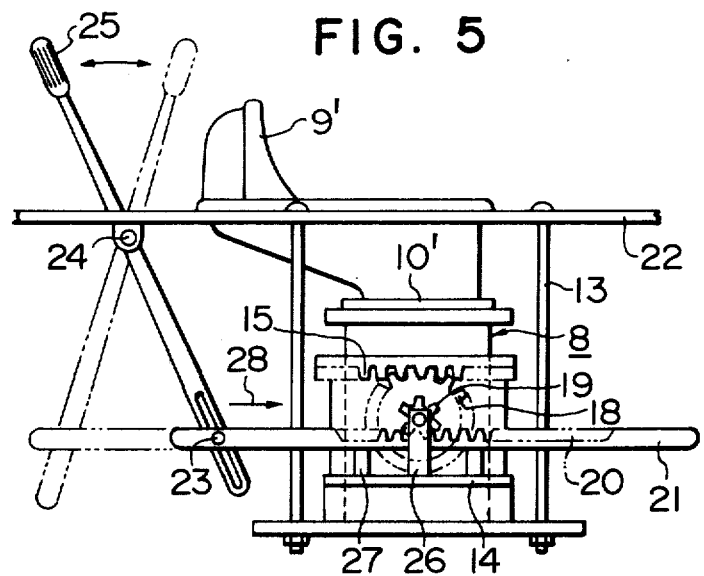
FIG. 5 is a side view showing the device of the present invention as applied to a Japanese style lavatory bowl.
Figure 6:
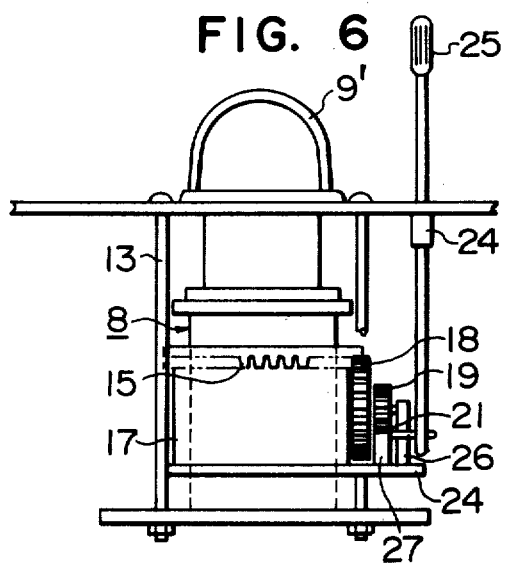
FIG. 6 is a front view of FIG. 5.
Figure 10:
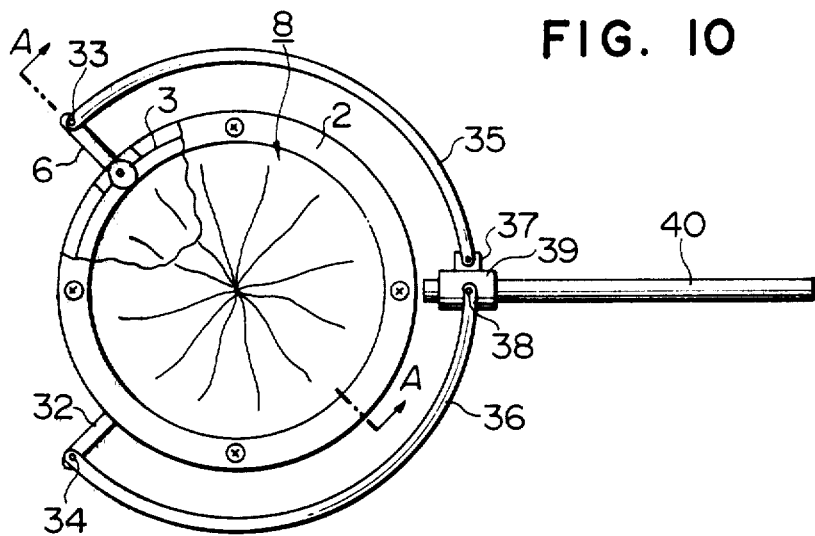
FIG. 10 is a plan view of FIG. 9.
Figure 11:
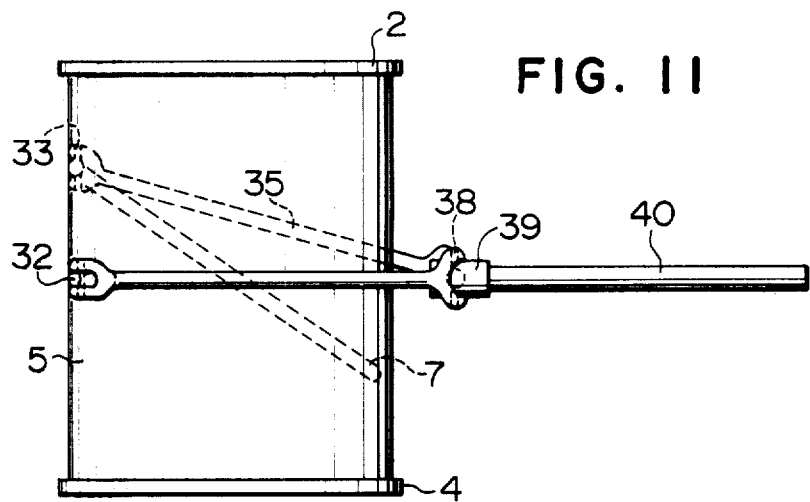
FIG. 11 is a side view of FIG. 9.

FIG. 4 shows the condition in which the throttle valve 8 is mounted in a Western style lavatory bowl 9, and FIG. 5 shows the condition in which the throttle valve 8 is mounted in a Japanese style lavatory bowl 9'.

In FIG. 4, the upper flange 2 of the inner cylinder 1 is attached to the excretion port 10 of the Western style lavatory bowl 9 while the outer cylinder 5 is connected to the outer wall of the Western style lavatory bowl 9.

In FIG. 5, the throttle valve 8 is mounted in the Japanese style lavatory bowl 9' by means of bolts 13 with the upper flange 2 of the inner cylinder 1 being connected to the excretion port 10' of the Japanese style lavatory bowl 9', while a guide 14 is provided around the outer periphery of the outer cylinder 5.

As shown in FIG. 7, a cylinder 17 is mounted on the guide so that the cylinder 17 is freely rotated around the outer cylinder 5, and the cylinder 17 is provided with a downwardly directed face gear 15 around the upper peripheral end thereof and a longitudinal slit 16 through which the lever 6 is adapted to extend outwardly. The face gear 15 meshes with a larger gear 18 mounted on a bearing 26 which is attached to the upper side of the guide 14.

A smaller gear 19 which is integrally secured to the larger gear 18 coaxial therewith engages with a rack 20 formed adjacent to one end of a rod 21 slidably supported by guides 27 secured to the guide 14 so as to be reciprocally moved in parallel to the floor plane 22, and the opposite end 23 of the rod 21 is pivotally connected with an elongated slit formed adjacent to the lower end of a lever 25 swingably supported by the floor plane 22 at its fulcrum 24 intermediate the lever 25 and extending upwardly and downwardly of the floor plane 22.

Since the present invention has the construction incorporated in the Japanese style lavatory bowl 9' as described above, the rod 21 pivotally connected at its opposite end 23 to the lower end of the lever 25 is moved along the guide 27 in the direction indicated by the arrow 28 in FIG. 5 by the rotation of the lever 25 about its fulcrum 24 when the upper end of the lever 25 is pushed forwardly as shown in FIG. 5, and, at the same time, the smaller gear 19 meshing with the rack 20 at the one end of the rod 21 is rotated in the anticlockwise direction so that the larger gear 18 integrally secured thereto coaxially is also rotated in the same direction as that of the smaller gear 19, thereby rotating the cylinder 17 in the clockwise direction as seen from the upper side in FIG. 5 by the engagement of the face gear 15 of the cylinder 17 with the larger gear 18.

Thus, the longitudinal slit 16 formed in the cylinder 17 is also rotated about the axis of the cylinder 17 in the clockwise direction as seen from the upper side of FIGS. 5 and 7, thereby moving the lever 6 extending outwardly through the slit 16 downwardly along the slit 16 by the sliding engagement thereof with the lever 6 toward the lower point of the slit 16 so that the lever 6 is brought to the lowest point Y of the helical slit 7 formed in the outer cylinder 5.

In case the present invention is incorporated in the Western style lavatory bowl 9, it is only necessary that the lever 6 is slidingly shifted obliquely downwardly along the helical slit 7 formed in the outer cylinder 5.

When the lever 6 reaches the lowest point Y of the slit 7 the upper cylindrical membrane 1a is completely opened while the lower cylindrical membrane 1b is completely closed or blocked so that the faeces or extrement 31 is stored within the lower cylindrical membrane 1b thereby preventing bad odor in the excrement reservoir 12 provided beneath the lavatory bowl 9, 9' from rising therefrom.

During the time the lavatory bowl is not used after the use thereof, the lever 25 is pulled toward the lavatory bowl 9' in the case of the Japanese style lavatory bowl 9', and, in the case of the Western style lavatory bowl 9, the lever 6 is moved toward the upper point X of the slit 7.

With such an operation, the upper cylindrical membrane 1a is held in its closed state while the lower cylindrical membrane 1b is held in the opened state, thus the faeces or the excrement 31 and the waste papers stored in the lower cylindrical membrane 1b fall into the excrement reservoir 12 and the bad odor from the excrement reservoir 12 is prevented from rising therefrom by means of the closed upper cylindrical membrane 1a.

In the embodiments described above, the inner diameter of the inner cylindrical 1 is selected to be 220mm. With such an increased dimension of the inner diameter of the inner cylinder 1, the excrement 31 falls directly into the lower cylindrical membrane 1b without causing any contact thereof with the inner wall 29 of the Western style lavatory bowl and the inner surface of the inner cylindrical membrane 1a, so that the contamination of the inner wall 29 of the Western style lavatory bowl and the upper cylindrical membrane 1a is positively prevented.

The excrement 31 contacts in effect with the inner surface of the lower cylindrical membrane 1b and sticking of the excrement to the inner surface of the membrane 1b might be feared. However, since the lower cylindrical membrane 1b is made of a material such as polytetrafluoroethylene having a low coefficient of surface friction as in the case of the upper cylindrical membrane 1a, the excrement 31 can be removed from the inner surface of the membrane 1b by the folds or surface irregularities of the wall of the lower cylindrical membrane 1b caused by the operation of the lever 6 thereby reducing the possibility of sticking the excrement 31 to the inner surface of the membrane 1b, and, even though sticking of the excrement 31 to the inner wall of the membrane 1b takes place, the upper cylindrical membrane 1a is at all times closed prior to, during and after the use of the lavatory bowl, so that the lower cylindrical membrane 1b is prevented from being viewed by the user, thereby eliminating the feeling of uneasiness of the user and making it unnecessary to wash the inner wall of the lavatory bowl by flowing water.

The upper rim 30 of the inner wall 29 of the lavatory bowl may be enlarged so as to meet the manner of using the lavatory bowl by the user, while the interior of the throttle valve 8 is positively prevented from being blocked so that the anti-odor effect can not be deteriorated by the blocking thereof by the excrement and the waste paper.

The embodiment illustrated in FIGS. 9 to 13 is an improvement in the throttle valve shown in FIGS. 1 to 8 which is incorporated in a lavatory bowl embodying the method of deodorizing the dipping up system of a lavatory in accordance with the present invention (referred to hereinafter as odorless lavatory device). The previously described throttle valve requires the rotation of the lever by at least 180° in order to render the upper cylindrical membrane 1a or the lower cylindrical membrane 1b to be completely opened or completely closed, so that the extent of the movement of the lever becomes greater as the inner diameter of the inner cylinder is increased thereby making the manipulation of the lever inconvenient. Thus, it is desired to provide means for decreasing the amount of movement of the lever. To this end, it is conceivable to utilize means such as linear linkage, gears, wires and chains. However, the linear linkage is complicated in construction and, in the device using gears, speed reduction is required for reducing the amount of movement by hand thereby requiring an assembly of a number of gears wherein large size gears are required in order to reduce the number of gears resulting in a large space to be occupied by the gears. Further, in the device using wires, a plurality of rollers are required for rotating the lever by 180° by the wires stretched around the rollers. In like manner, in the device using chains, the amount of movement by hand is increased or decreased depending upon the size of the sprockets as in the case of using gears thereby resulting in a large space to be occupied by the actuating mechanism.

The embodiment shown in FIG. 9 and the succeeding figures is proposed in the light of the above described defects of the prior art actuating mechanism.

In FIGS. 9, 10, 11 and 12, the outer cylinder 5 is made rotatable about its longitudinal axis and an arcuate inner flange rotating link 35 is pivotally connected at its one end to the outer end of the lever 6 extending through the helical slit 7 formed in the outer cylinder 5 and secured to the central flange 3 of the throttle valve 8 by means of a universal joint 33 while the other end of the link 35 is pivotally connected to a sliding block 39 slidably mounted on a guide rod 40 by means of a universal joint 37.

In like manner, an arcuate outer cylinder rotating link 36 is pivotally connected at its one end to the outer end of an outer cylinder rotating lever 32 secured to the outer surface of the outer cylinder 5 by means of joint pin 34 while the other end of the link 36 is pivotally connected to the sliding block 39 by means of a joint pin 38.

Figure 12A:
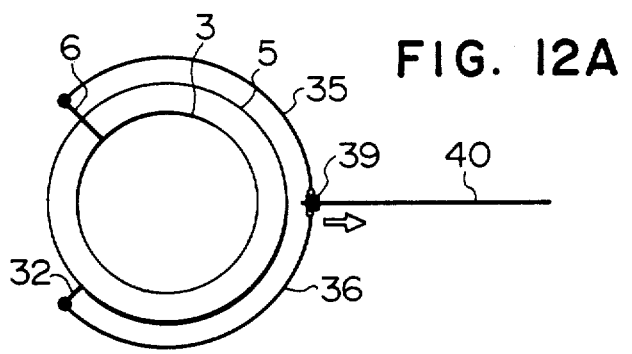
FIGS. 12A, 12B and 12C are schematic plan views showing respectively different modes of operation of FIGS. 9 to 11.
Figure 12B:
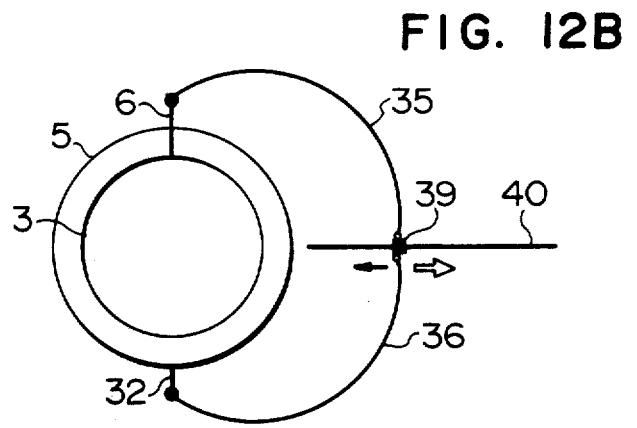
Figure 12C:
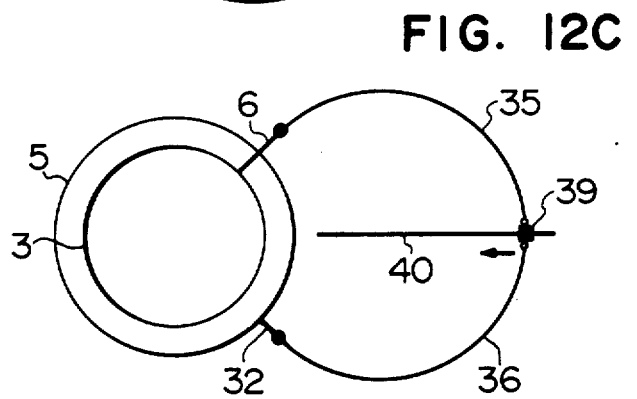

In FIG. 12A, when the sliding block 39 is positioned at the leftmost position on the guide rod 40, the upper cylindrical membrane 1a is closed. When the sliding block 39 is shifted along the guide rod 40 toward the right, the outer cylinder 5 and the central flange 3 of the inner cylinder 1 are each rotated by 90° in the opposite directions to each other as seen in FIG. 12B and FIG. 12C. During the rotation of the cylinder 5 and the central flange 3, the central flange 3 is lowered while it is rotated relative to the outer cylinder 5 because the central flange rotating lever 6 secured to the central flange 3 slidably fits in the helical guide slit 7 formed in the outer cylinder 5, so that the upper cylindrical membrane 1a is opened while the lower cylindrical membrane 1b is closed.

Concomitantly, when the sliding block 39 positioned at the rightmost position in the guide rod 40 as shown in FIG. 12C is shifted to the left, the outer cylinder 5 and the central flange 3 are respectively rotated in the reverse directions with respect to those when the sliding block 39 is shifted to the right as described previously by 90°, so that the lower cylindrical membrane 1b is opened while the upper cylindrical membrane 1a is closed as seen in FIG. 12A through the condition shown in FIG. 12B.

Figure 13:
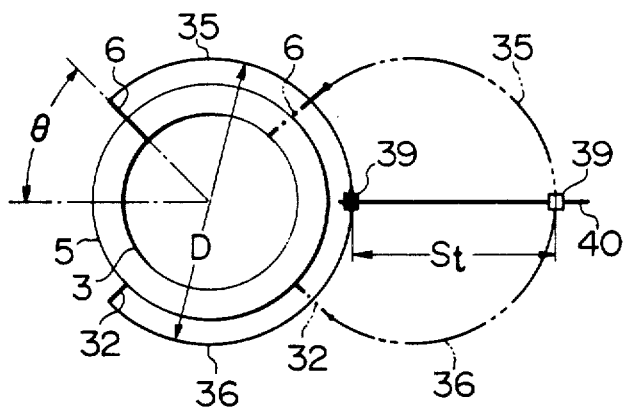
FIG. 13 is a schematic plan view showing the relationship between the parameters $\theta$, D and St for the embodiments seen in FIGS. 9 to 11.

In FIG. 13, the relationship between the angle $\theta$ which is a half of the angle formed between the outer cylinder rotating lever 32 and the central flange rotating lever 6 as positioned as shown in FIG. 13, the diameter D formed by the arcuate outer cylinder rotating link 36 and the arcuate central flange rotating link 35 as positioned as shown in FIG. 13 and the amount of movement St of the sliding block 39 along the guide rod 40 required to rotate the central flange 3 and the outer cylinder 5 by 90° in the opposite directions to each other is represented as follows:

$$St = D \sqrt{(\cos \frac{\theta}{2} + \frac{1}{2} \cos \theta)(\cos \frac{\theta}{2} - \frac{1}{2} \cos \theta)} + \frac{D}{2}(\sin \theta - 1) \quad (1)$$

where $\theta$ is in the range between 0° and 90°.
Therefore, under the condition $0° \leq \theta \leq 90°$, $$0 \leq \cos \theta \leq 1$$

$$\sqrt{2}/2 \leq \cos \theta/1 \leq 1$$

$$0 \leq \sin \theta \leq 1$$

Thus, the second term in the equation (1) is 0 or negative value. Further, the first term in the square root symbol takes the maximum value when $\theta = 0°$ and the value of the first term in the square root symbol becomes 3/4.

Therefore, the first term of the equation (1) is $$\frac{\sqrt{3}}{2} D$$

at the largest and is smaller than D at all times.
In other words, $$D \sqrt{(\cos \frac{\theta}{2} + \frac{1}{2} \cos \theta)(\cos \frac{\theta}{2} - \frac{1}{2} \cos \theta)} < D \quad (2)$$

$$D/2 (\sin \theta - 1) < 0 \quad (3)$$

from the equations (2), (3) and (1), $$St < D \text{ (provided that } 0° \leq \theta \leq 90°) \quad (4)$$

Therefore, the amount of movement St of the sliding block 39 is at all times smaller than the diameter D of each of the links 35, 36.

This means the decrease in the amount of movement by hand by virtue of the fact that the outer cylinder 5 and the central flange 3 are rotated by 90° in the opposite directions to each other, thus permitting the opening and closing mechanism of the throttle valve to be made compact.

As described above, the throttle valve can be opened and closed merely by the linear movement of the sliding block 39 along the guide rod 40 which causes the outer cylinder 5 and the central flange 3 to be rotated by 90° in the opposite directions to each other. Further, by virtue of the arcuate configuration of the links 35, 36, the opening and closing mechanism of the throttle valve can be made compact.

FIGS. 14 to 18 show another embodiment of the present invention. In these figures, a box-like outer wall 5' which may be cubic, rectangular, cylindrical or have a form analogous therewith (the drawings showing a rectangular shape of the outer wall) comprises an upper wall portion and lower wall portion having holes 41, 42 each having an appropriate size for receiving the upper and lower cylindrical membranes 1a, 1b and located in alignment with each other.

Figure 14:
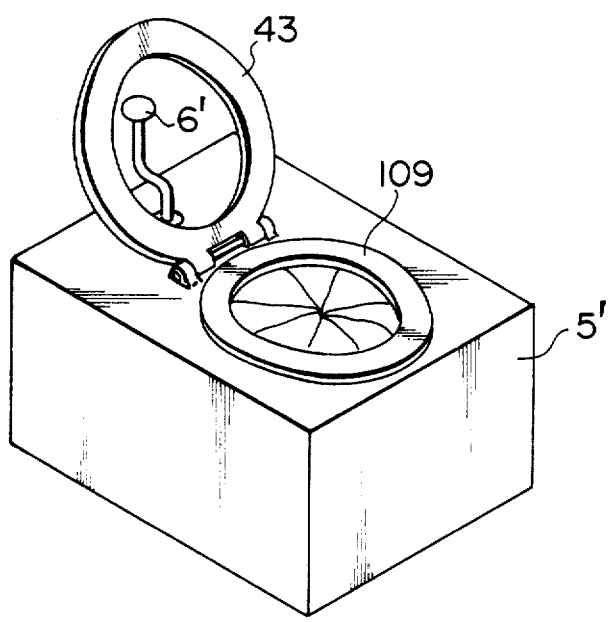
FIG. 14 is a general perspective view showing the appearance of a further embodiment of the present invention.

A lavatory seat 109 and a lavatory cover 43 are mounted on the upper wall portion of the outer wall 5' as shown in FIG. 14.

Figure 15:
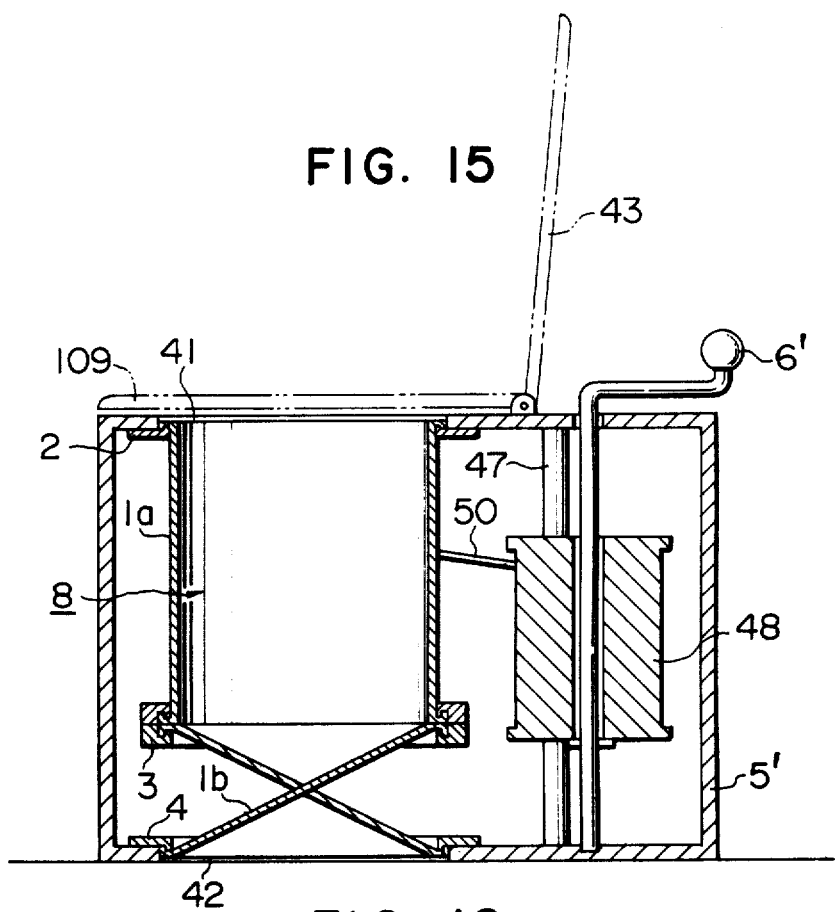
FIG. 15 is a longitudinal sectional view showing the throttle valve attached to the outer wall of the device of FIG. 14.

The throttle valve 8 is mounted in the outer wall 5' as shown in FIG. 15 with the upper flange 2 being secured to the hole 41 and with the lower flange 4 being secured to the hole 42 wherein either one of the upper and lower cylindrical membranes 1a, 1b is twisted about the axis thereof by 180° while the other membrane is held in its cylindrical form. In twisting the cylindrical membrane 1a or 1b by 180°, and particularly in twisting the upper cylindrical membrane 1a, for example, the lower cylindrical membrane 1b is held in its cylindrical form while the upper membrane 1a is twisted by 180° with respect to the central flange 3 wherein the upper flange 2 is lowered as the twisting proceeds so that any elongation of the material forming the upper cylindrical membrane 1a is prevented.

Now, the rotating mechanism of the central flange 3 incorporated in the embodiment shown in FIGS. 14 to 18 will be described below.

Figure 16:
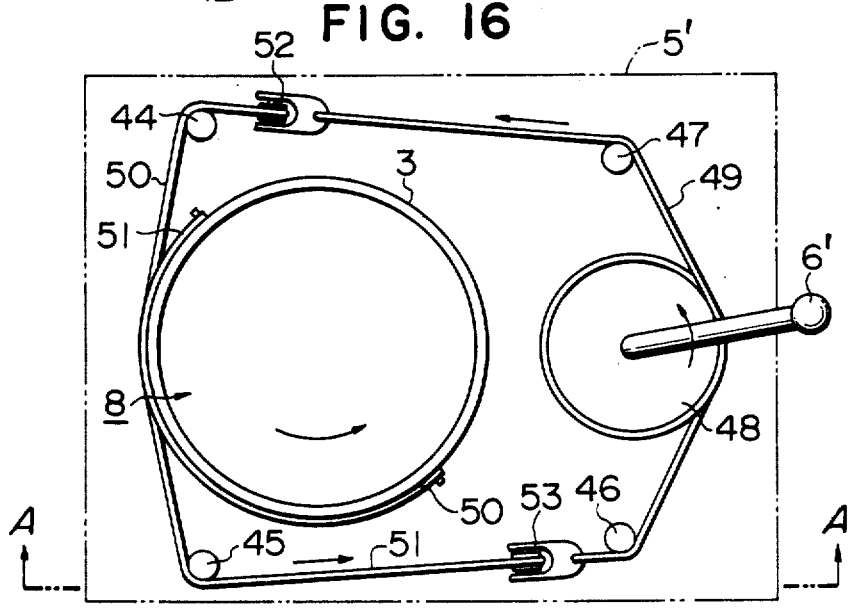
FIG. 16 is a plan view of FIG. 15 showing the rotating mechanism of the central flange.
Figure 17:
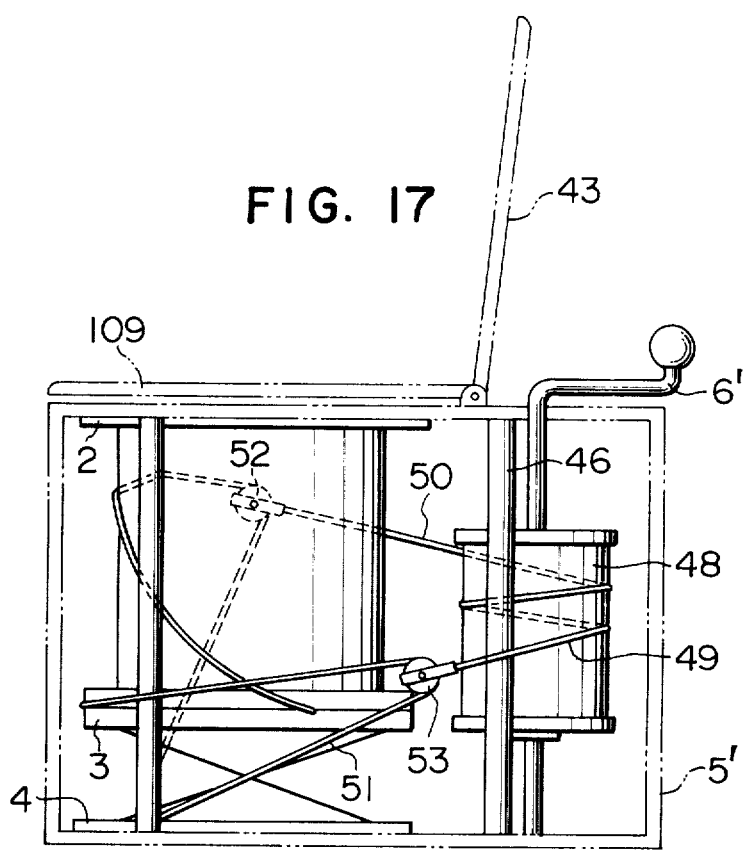
FIG. 17 is a side view as seen in the direction indicated by arrow A—A in FIG. 16.
Figure 18:
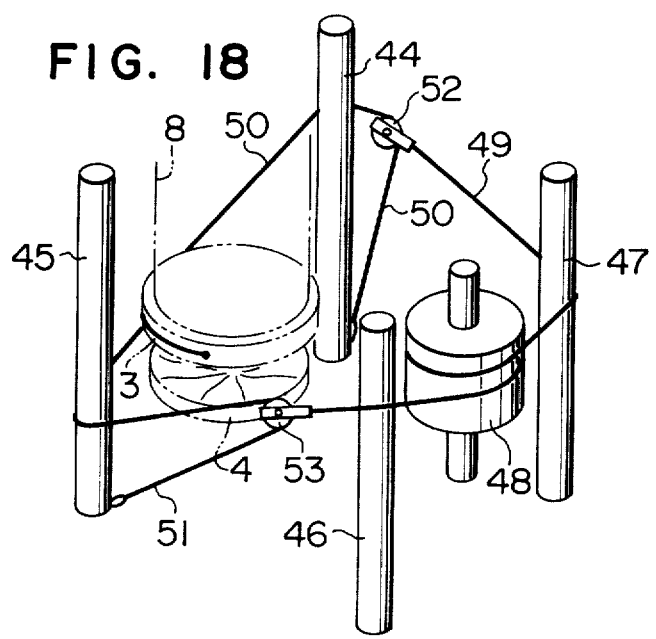
FIG. 18 is a perspective view showing the main part of the rotating mechanism of FIG. 16.

In FIG. 16, round or circular bars 44, 45, 46 and 47 are arranged longitudinally in parallel to each other so as to surround the throttle valve 8. A drum 48 is located between the round bars 46, 47 and, a lever 6' is secured to the upper surface of the drum 48 and it extends upwardly through the upper surface of the outer wall 5'. Wires 49, 50, 51 made of stainless steel are provided, the first wire 49 being wound around the drum 48 and one end of the wire 49 extends around the bar 47 toward the bar 44 and a running block 52 is attached to the one end of the wire 49 while the other end of the wire 49 extends around the bar 46 toward the bar 45 and a running block 53 is attached to the other end of the wire 49. As shown in FIG. 18, one end of the second wire 50 is attached to the lower end of the round bar 44 and the wire 50 extends around the running block 52, the bar 44 and around the outer peripheral surface of the central flange 3 of the throttle valve 8 and terminates on the peripheral surface of the flange 3 where the other end of the wire 50 is secured to the flange 3. One end of the third wire 51 is secured to the lower end of bar 45 and the wire 51 extends around the running block 53, the bar 45 and around the outer peripheral surface of the central flange 3 and terminates on the peripheral surface where the other end of the wire 51 is secured to the flange 3. The points at which the other ends of the wires 50, 51 are secured to the outer peripheral surface of the central flange 3 are preferably diametrically opposite to each other as shown in FIG. 16. Then, the stable rotation of the central flange 3 is achieved. When the drum 48 is rotated in the direction indicated by the arrow in FIG. 16, the central flange 3 is also rotated in the same direction as that of the drum 48 as indicated by the arrow, so that the upper cylindrical membrane 1a is opened while the lower cylindrical membrane 1b is closed. Likewise, when the drum 48 is rotated in the reverse direction to the arrow in FIG. 16, the lower cylindrical membrane 1b is opened while the upper cylindrical membrane 1a is closed. However, the rotating mechanism of the central flange 3 may not be limited to that as shown in these figures, and any of the linkage or gearing mechanism may be utilized in place of the embodiment shown in FIGS. 15 to 18.

In the embodiment described above, it is used by closing the lower cylindrical membrane 1b except for the time immediately after the use of the device. In other words, the faeces or the excrement is temporarily stored on the closed lower cylindrical membrane 1b as shown in FIG. 8A and, after use, the lever 6' is rotated so as to rotate the drum 48, thereby opening the lower cylindrical membrane 1b while the upper cylindrical membrane 1a is closed so that the excrement is allowed to fall into the excrement reservoir as shown in FIG. 8B.

In the embodiment shown in FIGS. 15 to 18, the rotatable shaft of the drum 48 located between the round bars 46 and 47 is shown as being in parallel to the central axis of the throttle valve 8. However, as shown in the embodiment illustrated in FIG. 20, the axis of the rotatable shaft of the drum 48 may be located perpendicular to the central axis of the throttle valve 8, or it may be obliquely located in inclined relationship with respect to the central axis of the throttle valve 8. And the round rod 44 and the 46 are arranged in substantial symmetry to the bar 45 and the bar 47, respectively with respect to the line connecting the center of the throttle valve 8 and the center of the drum 48. In the embodiment shown in FIG. 20, rotatable rollers 54, 55, 56 and 57 are rotatably mounted on the round bars 44, 45, 46, and 47, respectively, so that the wires 49, 50 and 51 are smoothly guided around these rollers 54, 55, 56 and 57. However, when the round bars 44, 45, 46 and 47 are arranged to be sufficiently smoothly rotatable, these rollers 54, 55, 56 and 57 may be dispensed with.

Figure 19:
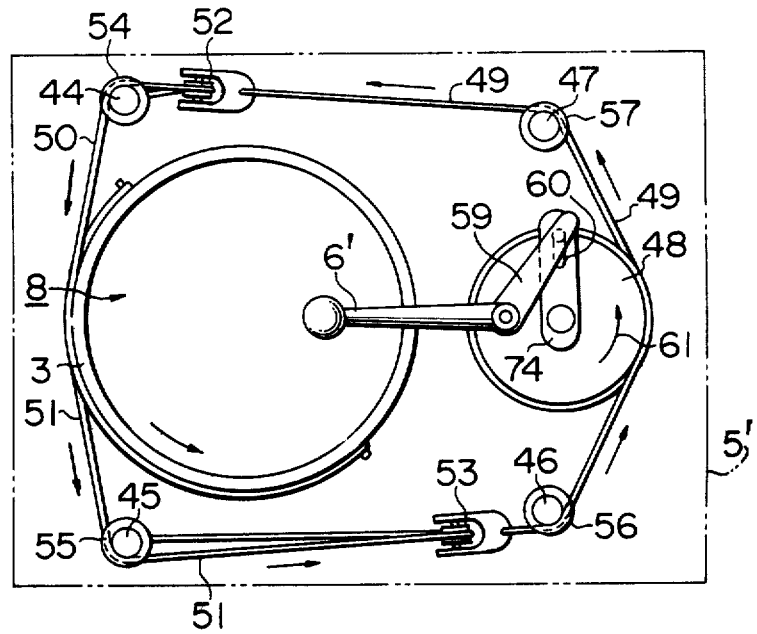
FIG. 19 is a plan view showing the opening and closing device of a still further embodiment of the throttle valve of the present invention.

In the embodiment shown in FIG. 19, a link 74 is shown as being fixedly attached to the upper surface of the drum 48, and the link 74 is formed with an elongated guide slit 60 adjacent to the outer end thereof. A link 59 is slidably connected at its one end to the guide slit 60 and the other end of the link 59 is secured to the lever 6'. With this arrangement, the drum 48 can be rotated by the required angle by the smaller amount of the manual operation in comparison with the case in which the lever 6' is directly attached to the drum 48.

Figure 20:
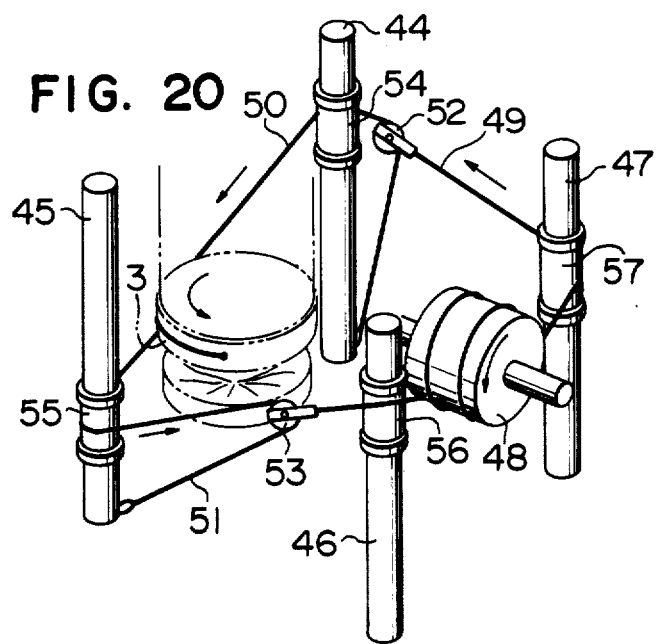
FIG. 20 is a perspective view showing another embodiment of the rotating mechanism of the present invention.
Figure 21:
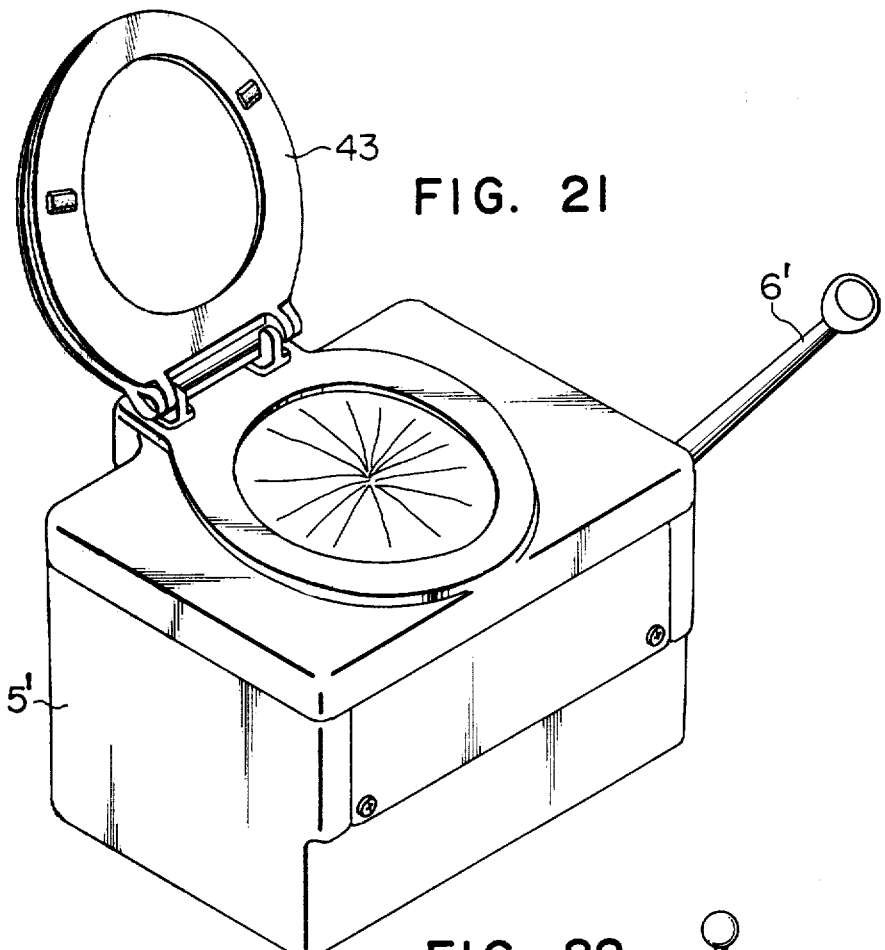
FIG. 21 is a general perspective view showing the appearance of a still further embodiment of the lavatory bowl of the present invention.
Figure 22:
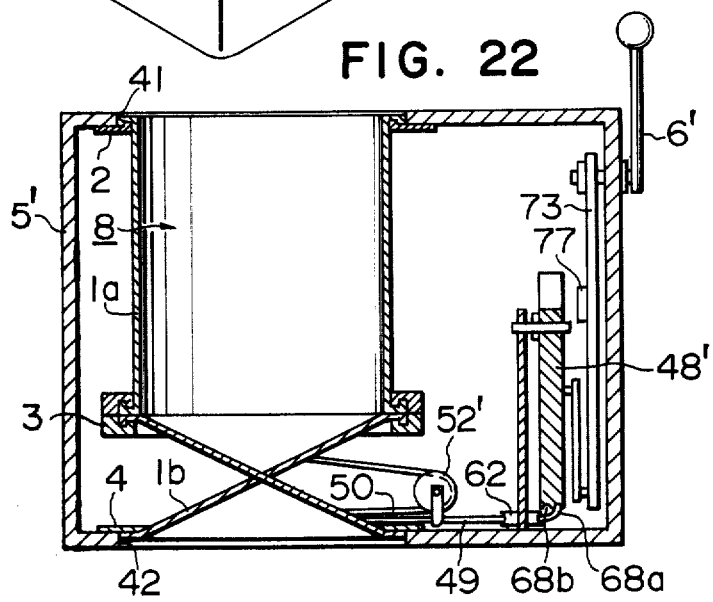
FIG. 22 is a cross-sectional front view showing the lavatory bowl of FIG. 21, FIG. 23 being a front view of FIG. 21 and FIG. 24 being a top plan view of FIG. 21.
Figure 23:
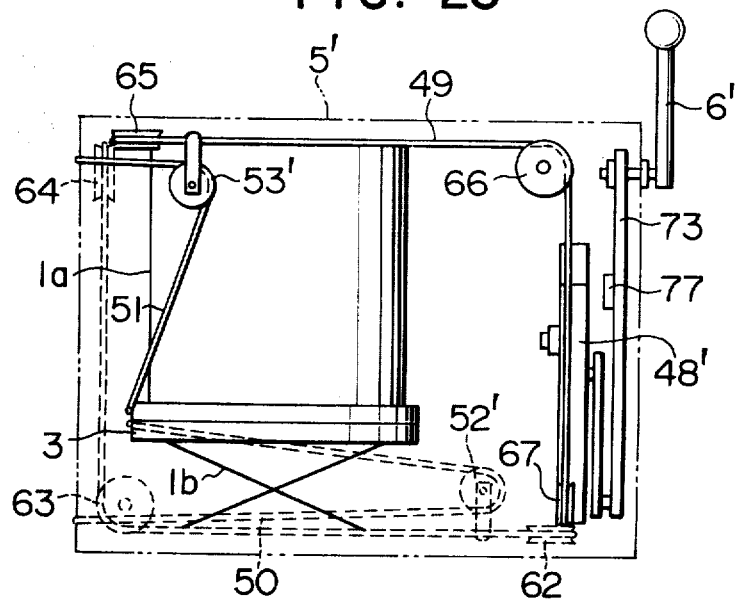

The embodiment illustrated in FIGS. 21 to 26 is an improvement in the embodiment shown in FIGS. 19 and 20. In the embodiment of FIGS. 19 and 20, the wires to which the running blocks are attached move up and down as the drum rotates, thereby moving the running blocks up and down resulting in complicated motion of these elements. Therefore, not only the stretching of the wires around the running blocks is made constable, but also the outer peripheral surface each of the upper and lower cylindrical membranes 1a, 1b is subjected to wear. The embodiment of FIGS. 21 to 26 improves the operation in that the wires are guided by standing blocks in place of the round bars and the running blocks are attached to the wires and the movement of each of the running blocks is made a simple linear motion while the outer peripheral surface each of the upper and lower cylindrical membranes 1a, 1b is prevented from being subjected to wear by the movement of the wires.

Figure 24:
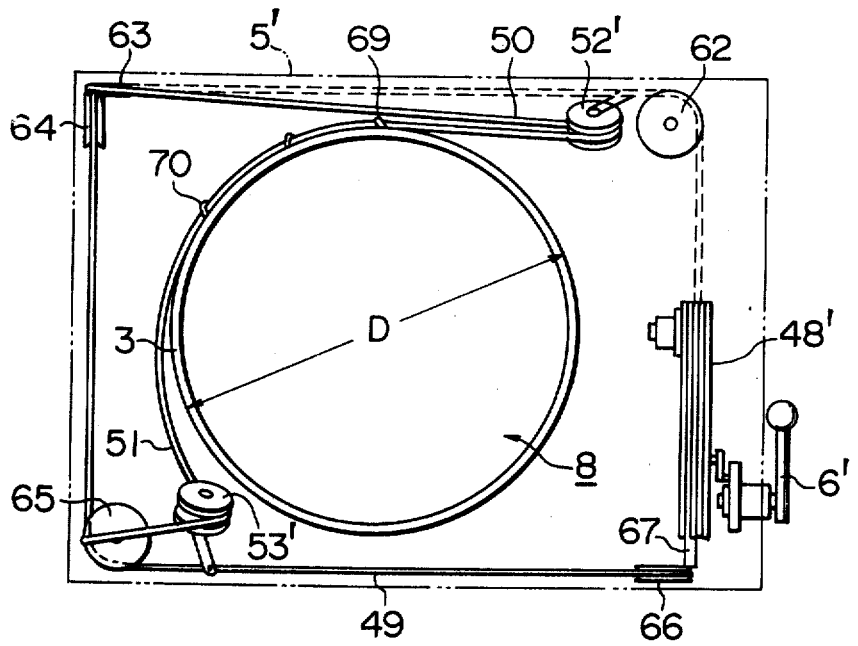
Figure 25:
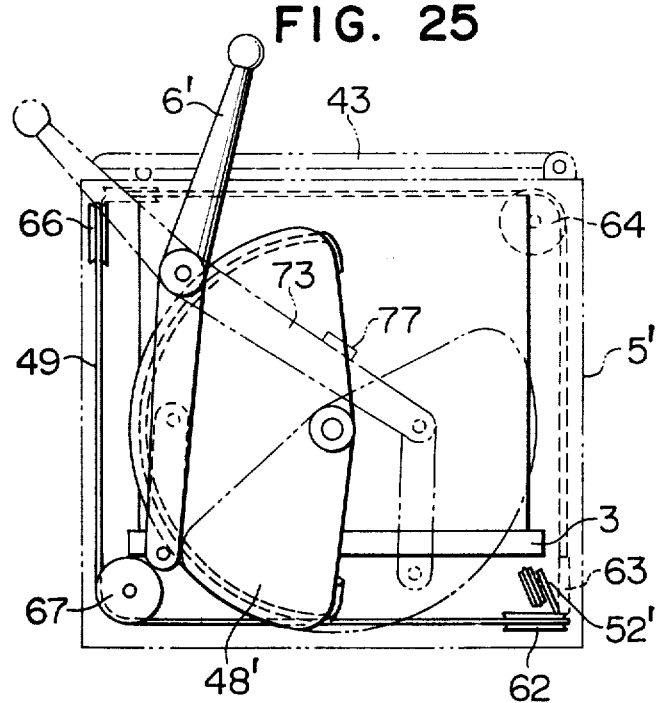
FIG. 25 being a side view of FIG. 21 and FIG. 26 being a schematic perspective view showing the mounting positions of the standing blocks mounted in the lavatory bowl of FIG. 21, the wire located at the side nearer to the viewer of the drawings being indicated by solid line in FIGS. 23 to 25 for the purpose of clarity while the wire located at the side remote from the viewer of the drawings is indicated by broken line in these drawings.
Figure 26:
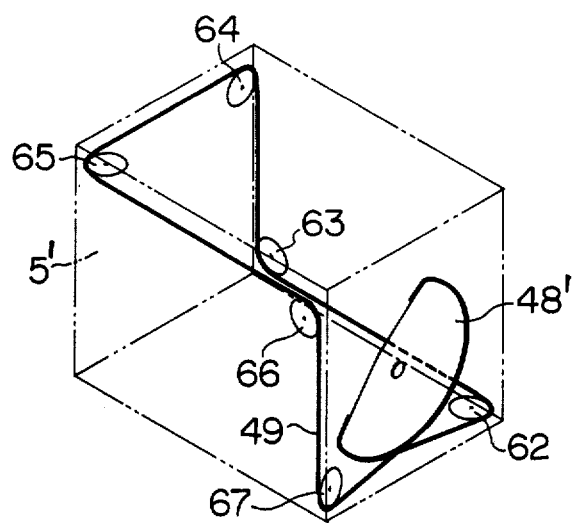

In these figures, standing blocks 62, 63, 64, 65, 66 and 67 are shown as being mounted in the interior of the outer wall 5'. As shown in FIG. 26, the standing blocks 62 and 63 are located at the opposite ends of the intersecting line of the lower wall portion and the rear wall portion of the outer wall 5' and the standing blocks 64 and 65 are located at the opposite ends of the intersecting line of one of the side wall portions and the upper wall portion of the outer wall 5' while the standing blocks 66 and 67 are arranged at the opposite ends of the intersecting line of the other side wall portion and the front wall portion of the outer wall 5'. The blocks 64 and 65 are arranged oppositely to each other and the blocks 62 and 67 are arranged oppositely to each other. A sector-shaped drum 48' is rotatably located between the other side wall portion of the outer wall 5' and the throttle valve 8, the rotatable shaft of the drum 48' being arranged perpendicular to the control axis of the throttle valve 8. In the embodiment shown, two peripheral grooves 68a, 68b are formed around the outer peripheral surface of the drum 48'. One end of the wire 49 made of a material such as stainless steel and the like is attached to the drum 48' and the wire 49 extends around the groove 68a and the standing blocks 62, 63, 64, 65, 66 and 67 and around the groove 68b and terminates at the drum 48' where the other end of the wire 49 is secured to the drum 48'. As shown in FIG. 24, a running block 52' is attached to a portion of the wire 49 stretched between the standing blocks 62 and 63 while a running block 53' is attached to a portion of the wire 49 stretched between the standing blocks 65 and 66, so that the running blocks 52' and 53' are moved together with the wire 49. A wire 50 is attached at its one end to an appropriate point on the outer wall 5' while one end of a wire 51 is attached to another appropriate point on the outer wall 5'. In this embodiment shown, the one end of the wire 50 is secured to the side wall portion of the outer wall 5' adjacent to the standing block 63 while the one end of the wire 51 is secured to the side wall portion of the outer wall 5' adjacent to the standing block 65. The wire 50 extends around the running block 52' and around the periphery of the central flange 3 and terminates on the periphery of the flange 3 where the other end of the wire 50 is secured to the flange 3. The wire 51 extends around the running block 53' and around the periphery of the central flange 3 and terminates on the periphery of the flange 3 where the other end of the wire 51 is secured to the flange 3. Eyes or rings 69 and 70 are secured to the outer periphery of the central flange 3 and the wire 50 is passed through the ring 69 while the wire 51 is passed through the ring 70. The lever 6' swingably mounted on the opposite side wall portion of the outer wall 5' is operatively connected at its lower end to the drum 48' as shown in FIG. 25, so that, when the lever 6' is swung in the direction indicated by the solid line in FIG. 25 by pulling the handle head of the lever 6' toward the rear wall portion of the outer wall 5', the running block 52' is moved toward the drum 48' as shown in FIG. 24, thereby rotating the central flange 3 of the throttle valve 8 while it is moved downwardly so that the lower cylindrical membrane 1b is closed and the upper cylindrical membrane 1a is opened. To the contrary, when the handle head of the lever 6' is pushed toward the front wall portion of the outer wall 5' so as to position the same as shown in two dot chain line in FIG. 25, the running block 53' is moved toward the drum 48' so that the central flange 3 is rotated in the reverse direction while it is moved upwardly, thereby closing the upper cylindrical membrane 1a while the lower cylindrical membrane 1b is opened. At this time, the running blocks 52' and 53' are moved together with the wire 49 to which they are attached between the standing blocks 62 and 63 and between the standing blocks 65 and 66, respectively, so that they are moved in a simple linear movement defined by the wire 49 without causing any complicated locas of movement of the running blocks. Further, since the wires 50, 51 are guided by the rings 69, 70 on the periphery of the throttle valve 8, the wires 50, 51 can not be frictionarily shifted axially on the periphery of the upper and lower cylindrical membranes 1a, 1b thereby positively preventing the same from being worn.

FIGS. 27, 28, 29A, 29B and 29C show an alternative embodiment of FIGS. 21 to 26.

Figure 27:
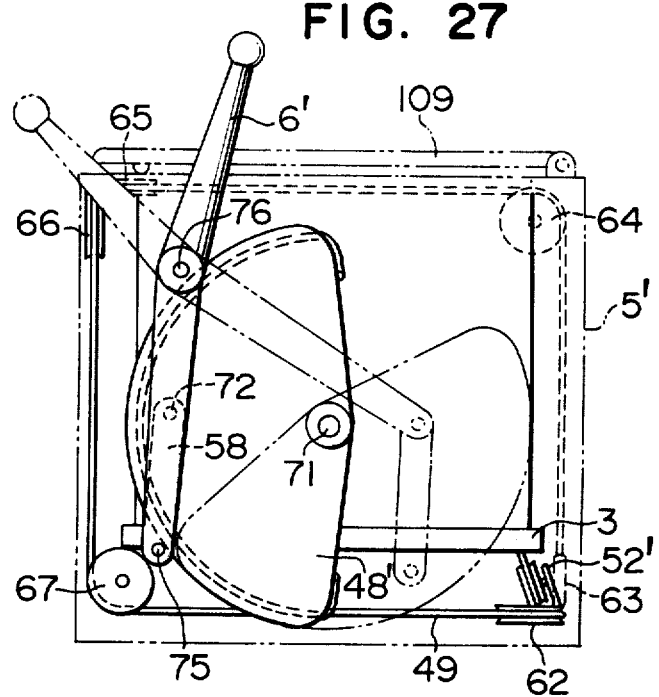
FIG. 27 is a side view showing a further embodiment of the lavatory bowl of the present invention.
Figure 28:
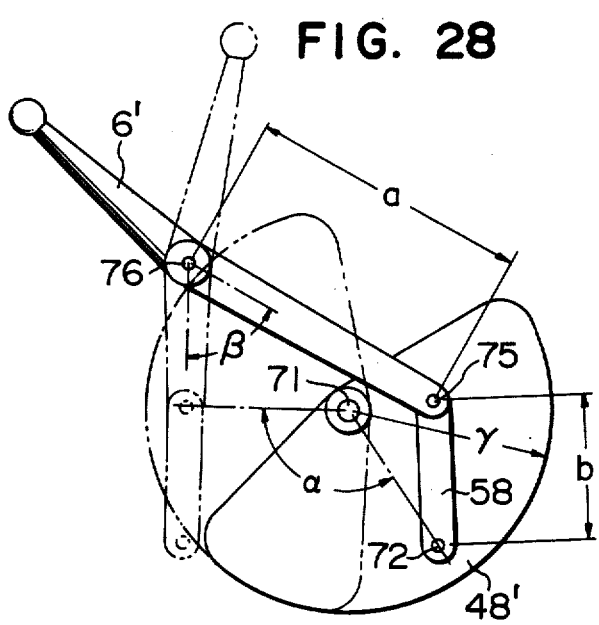
FIG. 28 is a side view showing the main parts of FIG. 27 for showing the operation and effectiveness thereof.

In FIGS. 27 and 28, the drum 48' substantially in the form of the semi-circle in cross-section is located with its rotatable shaft 71 being oriented perpendicular to the central axis of the throttle valve 8. Two circumferential grooves are formed around the outer periphery of the drum 48' and one end of a link 58 is pivotally connected by a pin 72 at an appropriate position on the side surface of the drum 48'. The other end of the link 58 is pivotally connected to the lower end of the lever 6' by a pin 75. The lever 6' per se is swingably supported by a supporting portion 76 provided on the side surface of the outer wall 5' so as to be swung about the supporting portion 76.

One end of a wire 49 made of a material such as stainless steel and the like is secured to the periphery of the drum 48', and the wire 49 extends around the groove of the drum 48' and the standing blocks 62, 63, 64, 65, 66 and 67 and back around the other groove of the drum 48' and terminates on the drum 48' where the other end of the wire 49 is secured to the drum 48'. In like manner as in FIG. 24, the running blocks 52, 53 are secured to portions of the wire 49 stretched between the standing blocks 62, 63 and between the standing blocks 65, 66, respectively, so that they are moved together with the wire 49. One ends of the wires 50, 51 are secured to appropriate positions on the outer wall 5', respectively, and the wire 50 extends around the running block 52 and around the central flange 3 of the throttle valve 8 and terminates on the flange 3 where the other end of the wire 50 is secured thereto, while the wire 51 extends around the running block 53 and the periphery of the central flange 3 and terminates thereat where the other end of the wire 51 is secured to the flange 3.

The radius of the drum 48' is preferably made equal to or slightly greater than the radius of the outer periphery of the central flange 3 of the throttle valve 8 and the width or length of the drum 48' is preferably made as small as possible. In the embodiment shown, since the link 58 is interposed between the lever 6' and the drum 48' so that the drum 48' is rotated by the lever 6' through the link 58, the amount of the manual operation, i.e., the rotational angle of the lever 6' required for opening and closing the throttle valve 8 can be made extremely small. In explaining the above by the numerical data, it is assumed that the length a between the supporting portion 76 of the lever 6' and the lower end of the lever 6' is 200mm, the length b of the link 58 is 100mm, the outer diameter D of the central flange 3 of the throttle valve 8 is 280mm (the radius R = 140mm) and the radius r of the drum 48' is 140mm, then the rotational angle $\alpha$ of the drum 48' required for rotating the central flange 3 of the throttle valve 8 by 180° is 123°, however, the rotational angle $\beta$ of the lever 6' required for effecting the rotation of the flange 3 by 180° is merely 63°. Since the relationship between the angles $\alpha$ and $\beta$ is determined by the value $a$, the opening and closing of the throttle valve 8 can be carried out by the small amount of manual operation of the lever 6' by appropriately selecting the values of $a$ and $b$. Further, since the drum 48' is made in the form of a semi-circle, the cost for making the drum 48' can be lowered while the weight of the drum 48' is made low. Since the axis of the drum 48' having the outer diameter substantially equal to that of the throttle valve 8 is located perpendicular to the axis of the throttle valve 8, the space for housing the drum 48' can be made small and, hence, the overall size of the odorless lavatory device can be made compact.

Turning again to FIGS. 22, 23 and 25, a stopper 77 is provided at appropriate position in the arm lever portion 73 of the lever 6' in the outer wall 5'. The function of the stopper 77 will now be described with reference to FIGS. 29A, 29B and 29C.

Figure 29A:
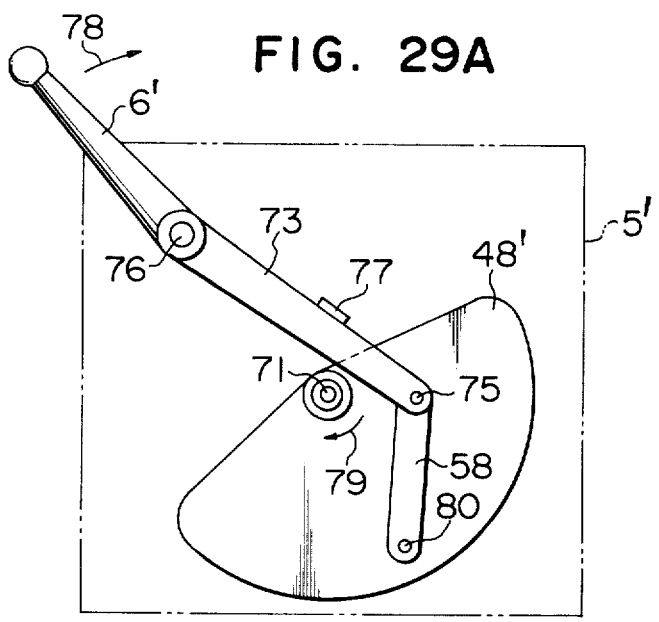
FIGS. 29A, 29B and 29C are side views showing respectively different mode of operation of the opening and closing device of the throttle valve shown in FIGS. 22 to 25.
Figure 29B:
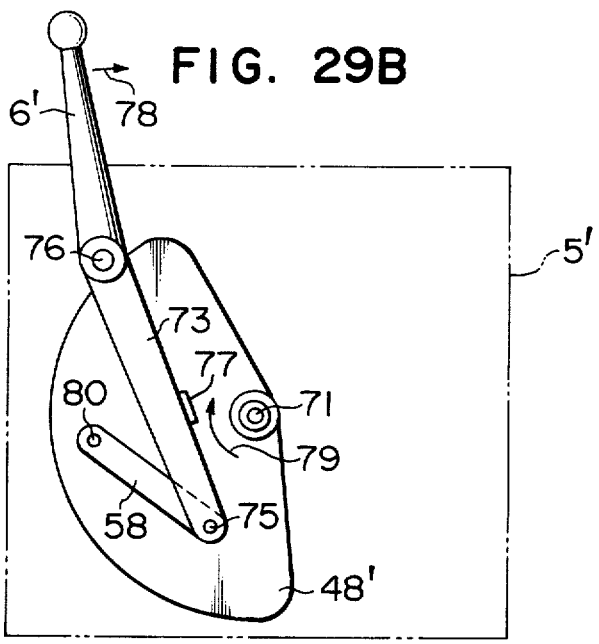
Figure 29C:
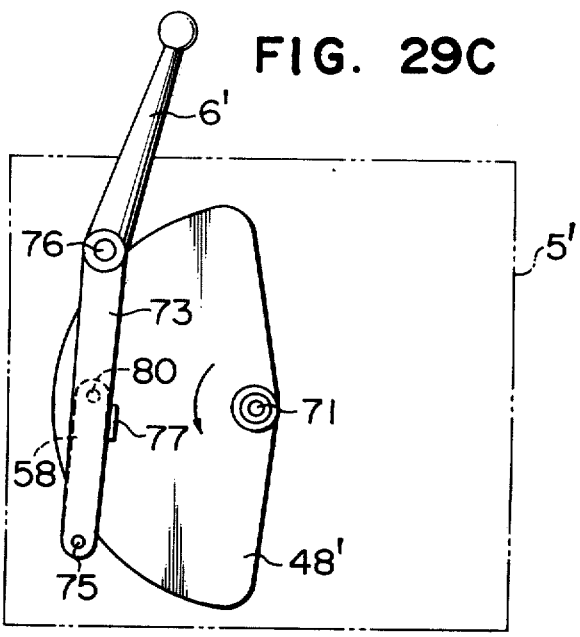
Figure 30:
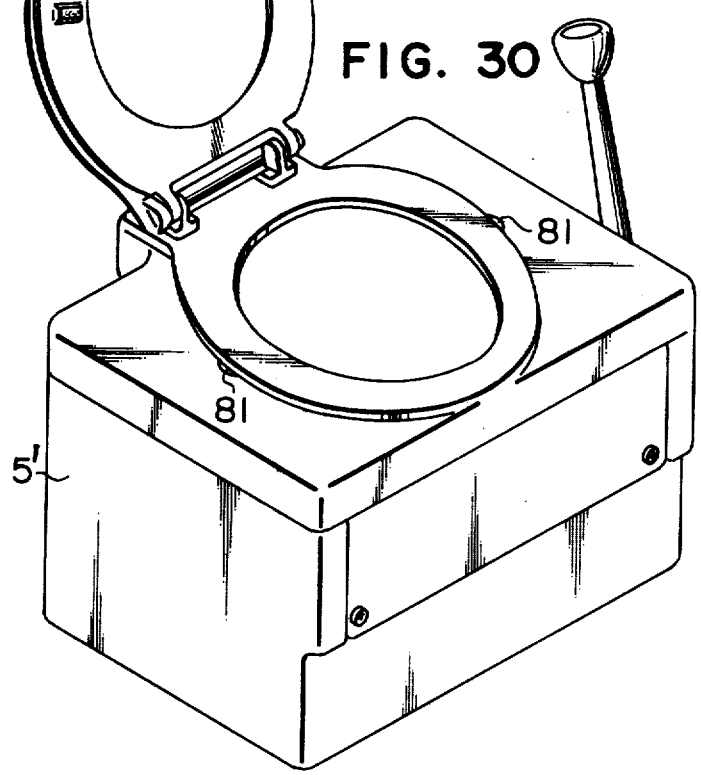
FIG. 30 is a general perspective view showing the appearance of a further embodiment of the odorless lavatory device of the present invention.
Figure 31:
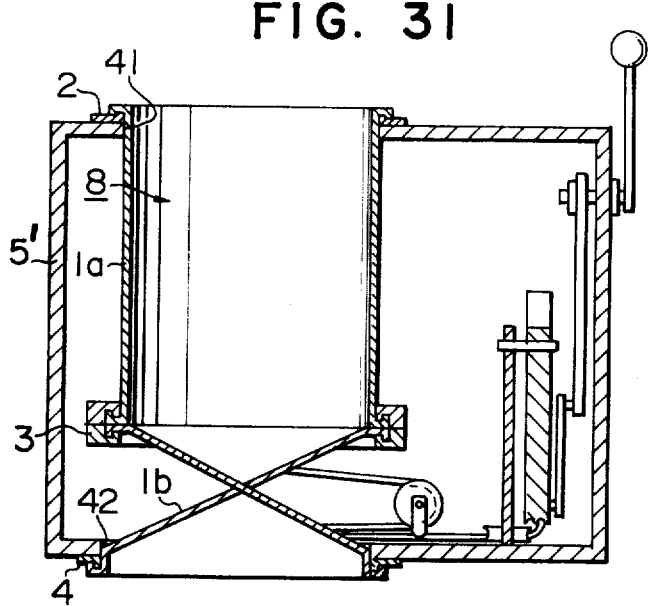
FIG. 31 is a longitudinal sectional view of FIG. 30.

FIG. 29A shows the throttle valve 8 in which the upper cylindrical membrane 1a is closed while the lower cylindrical membrane 1b is opened. In the condition shown in FIG. 29A, the link 58 is located to the left of the arm lever portion 73 of the lever 6'. When the lever 6' is rotated in the direction indicated by the arrow 78 in FIG. 29A, the connecting point 80 of the link 58 to the drum 48' moves nearer to the arm lever portion 73 of the lever 6' as shown in FIG. 29B, and the drum 48' is rotated in the direction of the arrow 79 around the rotatable shaft 71 of the drum 48'. Therefore, the upper cylindrical membrane 1a commences to be opened and the lower cylindrical membrane 1b is being closed. Continued rotation of the lever 6' in the direction of the arrow 78 causes the connecting portion 80 to further approach the lever 6', and the link 58, after overlapping the arm lever portion 73 of the lever 6' as shown in FIG. 29C, tends to be moved to the right of the arm lever portion 73 of the lever 6'. However, when the central axis of the link 58 moves slightly to the right with respect to the central axis of the lever 6', the link 58 abuts against the stopper 77 formed in the arm lever portion 73 of the lever 6' so that the stopper 77 prevents the further movement of the link 58 to the right. At this point, the link 58 can not be returned by the gravity of the drum 48' only even though the hand of the user is disengaged from the lever 6'. In other words, the drum 48' can not be rotated in the direction opposite to that shown by the arrow 79. If the arrangement of the link 58 and the lever 6' is so determined that the lower cylindrical membrane 1b is completely closed when the link 58 and the arm lever portion 73 of the lever 6' are brought to the positions overlapping each other as shown in FIG. 29C, the lower cylindrical membrane 1b is positively held in its closed position unless the lever 6' is rotated.

Therefore, after the user uses the lavatory device under the condition as shown in FIG. 29C, he rotates the lever 6' in the direction opposite to that shown by the arrow 78 so as to open the lower cylindrical membrane 1b thereby discharging therefrom the faeces or the excrement into the excrement reservoir, and, thereafter, he again rotates the lever 6' in the direction of the arrow 78 until the link 58 abuts against the stopper 77 of the lever 6'. Thus, the lower cylindrical membrane 1b is kept in completely closed condition except the time immediately after the use of the lavatory device and the resilient nature of the material forming the lower cylindrical membrane 1b insures the completely closed condition of the lower cylindrical membrane 1b thereby positively preventing bad odor from rising from the excrement reservoir into the lavatory room. Further, since the drum 48' is rotated by the lever 6' through the link 58, the amount of manual operation of the lever 6' by the user in opening and closing the throttle valve 8 can be made small.

The embodiments shown in FIGS. 30 to 46 are directed to improvements in the mounting device of the throttle valve for facilitating the attachment and detachment of the throttle valve 8 to and from the outer wall 5' of the odorless lavatory device for preventing bad odor from the excrement reservoir by using the throttle valve 8 which comprises an upper cylindrical membrane 1a having an upper flange 2 at the upper end thereof and a lower cylindrical membrane 1b having a lower flange 4 at the lower end thereof and connected at its upper end to the lower end of the upper cylindrical membrane 1a by a central flange 3, either one of the cylindrical membranes 1a, 1b being adapted to be alternately twisted by 180° about its axis while the other is held in its cylindrical shape so as to be closed for preventing bad odor passing therethrough.

Figure 32:
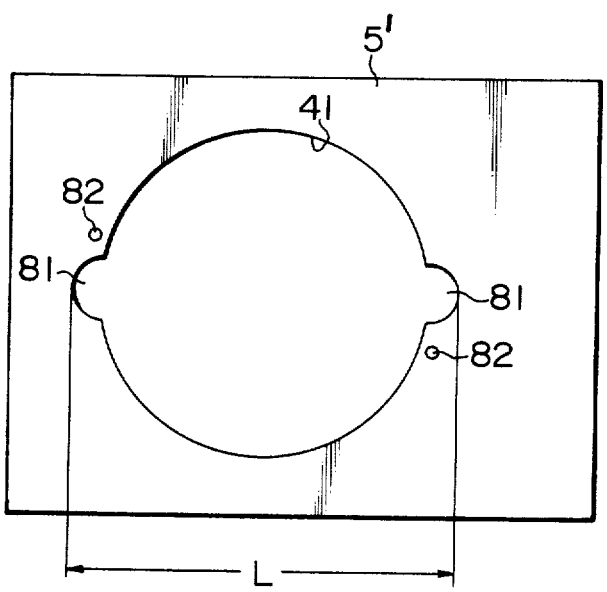
FIG. 32 is a top plan view of the upper side of the outer wall of the odorless lavatory device of FIG. 30.
Figure 33:
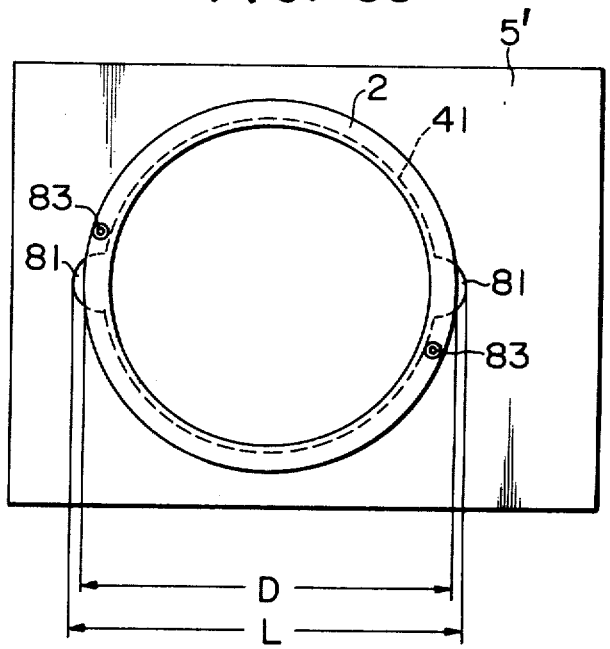
FIG. 33 is a top plan view showing the upper side of the outer wall of the odorless lavatory device with the throttle valve mounted therein.

In attaching the throttle valve 8 to the outer wall 5', it is necessary for either one of the cylindrical membranes 1a, 1b to be twisted by 180° for mounting the membranes 1a, 1b on the outer wall 5', thereby making the mounting troublesome. The embodiments shown improve the mounting process. As shown in FIG. 33, the diameter each of the holes 41, 42 is made larger than the inner diameter each of the upper flange 2 and the lower flange 4 bur smaller than the outer diameter of the flanges 2 and 4. Half circular notches 81, 82 are formed diametrically oppositely in the periphery each of the holes 41, 42 in alignment with each other. The span or the length L between the notches 81 and 82 is made greater than the outer diameter D each of the upper and lower flange 2 and 4. As described above, the throttle valve 8 is attached to the outer wall 5' with either of the cylindrical membranes 1a, 1b being twisted by 180° and the upper flange 2 and the lower flange 4 being secured to the holes 41, 42, respectively. The upper flange 2, the central flange 3 and the lower flange 4 are first located between the holes 41, 42 with the flanges 2, 3, 4 being arranged in superimposed relationship, and then the upper flange 2 is passed through the notches 81, 81 of the hole 41 upwardly with the flange 2 oriented substantially vertically, and thereafter the upper flange 2 is positioned horizontally so as to be secured to the upper wall portion of the outer wall 5' by means of bolts and the like. Then, the central flange 3 is twisted by 180° with respect to the upper flange 2 and the lower flange 4 is passed through the notches 81, 81 of the hole 42 downwardly so as to be secured to the lower wall portion of the outer wall 5' in like manner as described above. The mounting of the throttle valve 8 is further facilitated by providing markings at appropriate positions adjacent to the periphery of each of the holes 41, 42 and on the upper and lower flanges 2, 4, so that the throttle valve 8 can be attached to the outer wall 5' with either of the cylindrical membranes 1a, 1b being twisted by 180° when the upper and lower flanges 2 and 4 are secured to the upper and lower wall portions of the outer wall 5' by bringing the marking adjacent to the periphery of the respective hole 41, 42 in coincidence with the marking on the respective flange 2, 4. Alternatively, as shown in FIG. 32, a pair of pins 82 are provided at appropriate positions adjacent to the periphery of each of the holes 41, 42, while, as shown in FIG. 33, corresponding holes 83 are formed in each of the upper and lower flanges 2, 4 for receiving the pins 82 when the flanges 2, 4 are fitted in the holes 41, 42 in positions so that either one of the cylindrical membranes 1a, 1b is twisted by 180° when the pins 82 are received in the holes 83 of the respective flanges 2, 4. By such an arrangement, the throttle valve 8 can be easily attached to the outer wall 5'.

Figure 34:
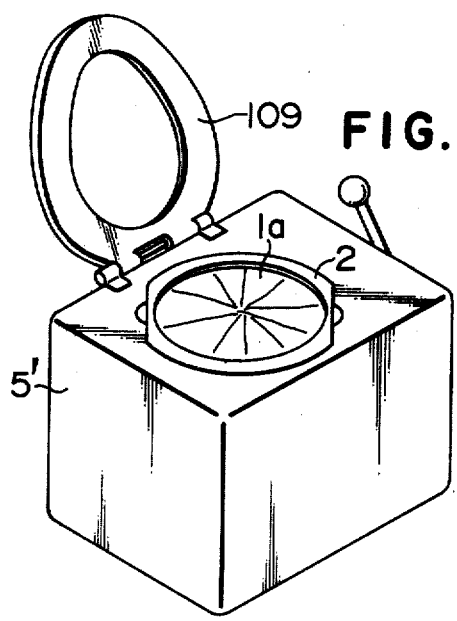
FIG. 34 is a general perspective view showing the appearance of a still further embodiment of the lavatory bowl of the present invention.
Figure 35:
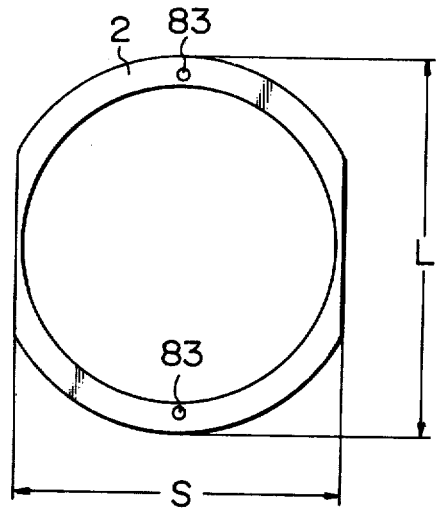
FIG. 35 is a plan view showing the upper flange of the throttle valve of the lavatory bowl of FIG. 34.
Figure 36:
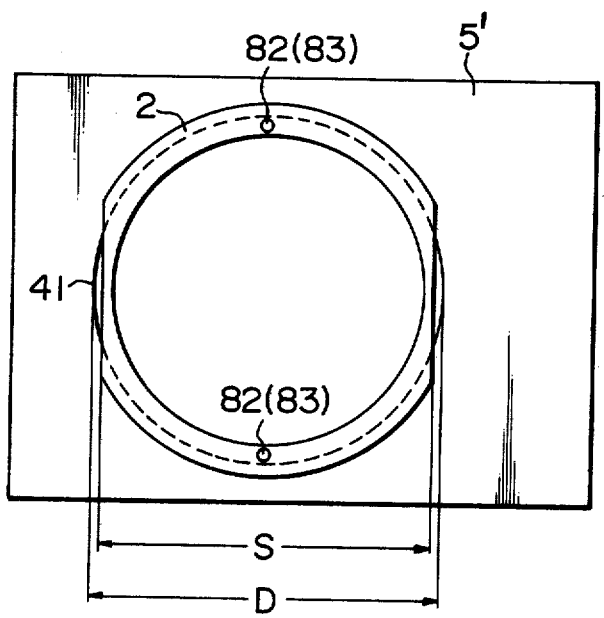
FIG. 36 is a plan view showing the outer wall of the lavatory bowl of FIG. 34 with the throttle valve mounted thereon.
Figure 37:
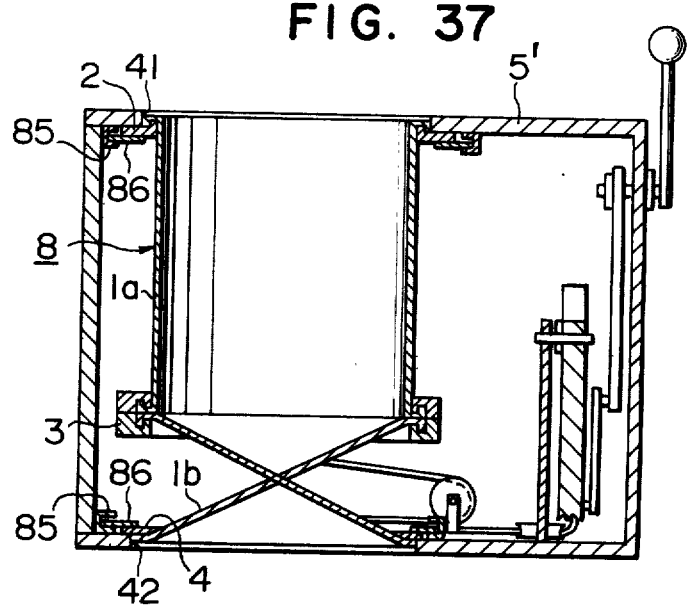
FIG. 37 is a longitudinal sectional side view showing another embodiment of the odorless lavatory device of the present invention.

Now, the embodiment shown in FIGS. 34 to 36 will be described. As shown in FIG. 35, the outer periphery each of the upper and lower flanges 2, 4 is made substantially in the eliptical form, while the inner periphery is in the circular form. As shown in FIG. 36, the outer diameter D of the respective holes 41, 42 is greater than the mirror diameter S of the outer periphery each of the upper and lower flanges 2, 4 but smaller than the major diameter L of the flanges 2, 4.

When the throttle valve 8 is mounted on the outer wall 5', the cylindrical membranes 1a, 1b are folded together, i.e., the upper flange 2, the central flange 3 and the lower flange 4 are superposed upon each other, and they are located between the holes 41, 42. Then, the upper flange 2 is positioned in the vertical position and is passed through the hole 41 upwardly and then turned to the horizontal position so that it is secured to the upper surface of the outer wall 5' by means of bolts and the like. Then, the central flange 3 and the lower flange 4 are rotated about the longitudinal axis of the cylindrical membranes 1a, 1b by 180° with respect to the upper flange 2, and the lower flange 4 is turned to the vertical position so as to be passed through the hole 42 downwardly. After passing through the hole 42, the lower flange 4 is again turned to the horizontal position and secured to the lower surface of the outer wall 5' by means such as bolts and the like.

As shown in FIG. 36, projections or pins 82 may be provided on the upper surface and the lower surface of the outer wall 5', respectively, and corresponding holes 83 may be formed in the upper and lower flanges 2 and 4 for permitting the pins 82 to be received in the holes 83 when the flanges 2 and 4 are mounted on the outer wall 5' with either one of the cylindrical membranes 1a, 1b is twisted by 180°, thereby making it possible to secure the throttle valve 8 to the outer wall 5' without using the bolts and the like.

Figure 38:
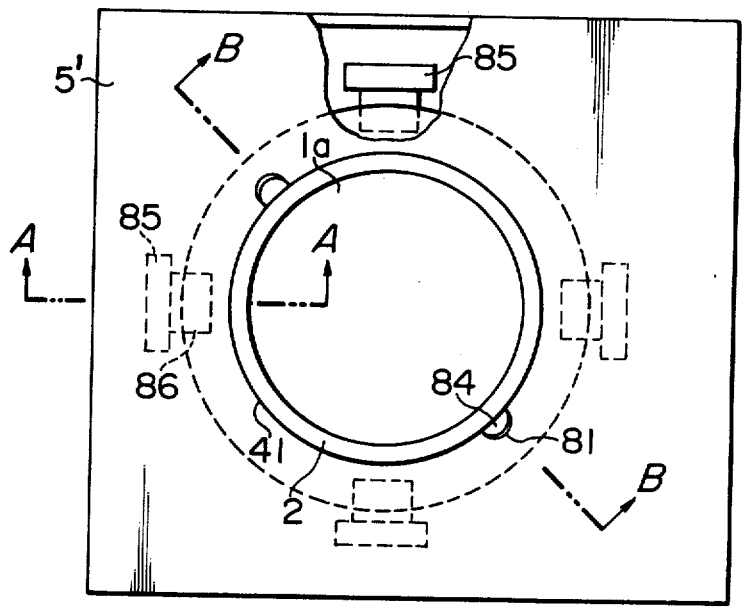
FIG. 38 is a plan view showing the upper side of the outer wall of the device of FIG. 37 with the upper side of the outer wall partly broken away for illustrating the throttle valve mounted thereon.
Figure 39A:
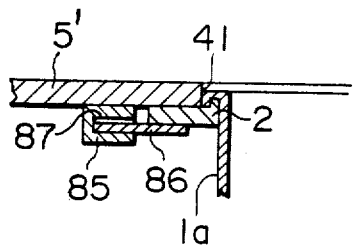
FIGS. 39A, 39B and 39C are fragmentary sectional views taken along line A—A in FIG. 38, respectively, showing various designs of the mounting of the throttle valve, respectively.
Figure 39B:
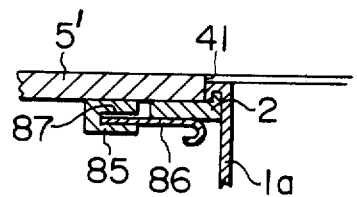
Figure 39C:
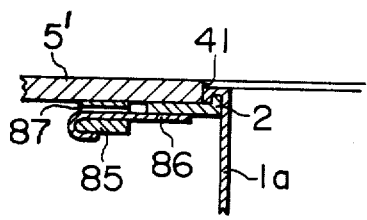
Figure 40:
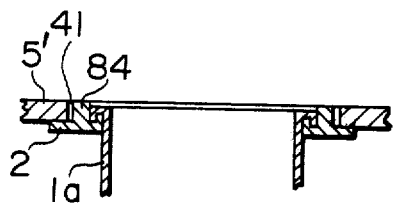
FIG. 40 is a fragmentary sectional view taken along line B—B in FIG. 38.
Figure 45:
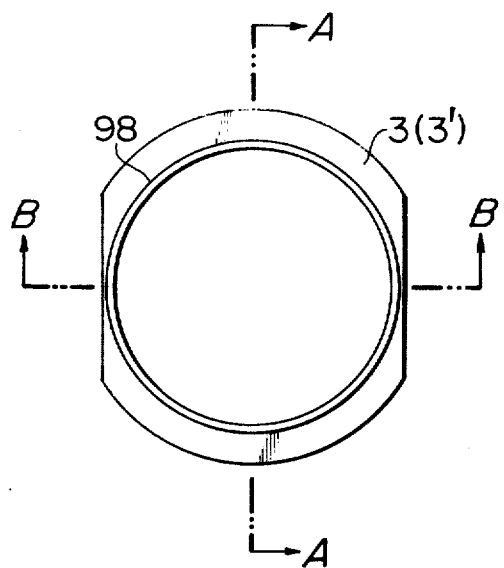
FIG. 45 is a plan view showing the central flange of a further embodiment of the present invention.
Figure 46:
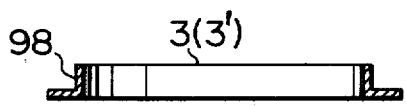
FIG. 46 is a sectional view taken along line A—A in FIG. 45.
Figure 47:
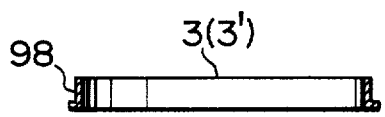
FIG. 47 is a sectional view taken along line B—B in FIG. 45.

The embodiment shown in FIGS. 37 to 40 is directed to the improvement in the previously described embodiment in that not only the mounting of the throttle valve on the outer wall is facilitated but also the detachment of the throttle valve from the outer wall is facilitated. In FIG. 38, projections 84, 84 are provided around the upper flange 2 and the lower flange 4, respectively, in diametrically opposite points thereof, while corresponding notches 81, 81 are formed in the upper wall portion and the lower wall portion of the outer wall 5' in corresponding positions to the projections 84, 84 for snugly receiving the same when the flanges 2, 4 are mounted in position in the outer wall 5'. An appropriate number (four in the illustrated embodiment) of supporting plate receivers 85 are provided at the peripheral portion each of the holes 41, 42 in the inner surfaces of the upper and lower wall portions of the outer wall 5'. Each of the receivers 85 has a supporting plate inserting space 87 for receiving the supporting plate 86. The supporting plate 86 may be in the form of flat plate as shown in FIG. 39A. However, the supporting plate 86 may be provided with a U-shaped bent portion at one end thereof as shown in FIGS. 39B and 39C so that the attachment and detachment of the supporting plate 86 to and from the supporting plate receiver 85 is facilitated. The supporting plate inserting space 87 may be in the form of a recess formed in the supporting plate receiver 85 as shown in FIGS. 39A and 39B so that the cross-section of the receiver 85 is made in the U-shape. Alternatively, as shown in FIG. 39C, the supporting plate inserting space 87 may be in the form of a through hole formed in the supporting plate receiver 85 having the width and the thickness corresponding to those of the supporting plate 86.

When the supporting plates 86 are mounted in the supporting plate receivers 85, a clearance equal to or slightly greater than the thickness of the upper flange 2 must be provided between the upper surface of the supporting plate 86 and the inner surface of the upper wall portion of the outer wall 5', and a similar clearance must be provided between the lower surface of the supporting plate 86 secured to the lower wall portion of the outer wall 5' and the inner surface of the lower wall portion of the outer wall 5'.

In the embodiment shown, when the throttle valve 8 is mounted in the outer wall 5', the upper flange 2, the central flange 3 and the lower flange 4 are superposed upon each other, i.e., both the cylindrical membranes 1a, 1b are folded together and brought between the holes 41, 42, and the projections 84, 84 provided on the lower surface of the lower flange 4 are fitted in the notches 81, 81 of the hole 42 and the supporting plates 86 are inserted in the supporting plate inserting spaces 87 in the supporting plate receivers 85. Then, the lower flange 4 is clamped between the supporting plates 86 and the lower wall portion of the outer wall 5' while the flange 4 is prevented from rotation in the horizontal direction by virtue of the engagement of the projections 84, 84 with the notches 81, 81, thereby permitting the lower flange 4 to be secured positively to the hole 42. Thereafter, the upper flange 2 and the central flange 3 are rotated together by 180° in the horizontal direction with respect to the lower flange 4 and the upper flange 2 is moved upwardly so as to bring the projections 84, 84 provided on the upper flange 2 into engagement with the notches 81, 81 and the supporting plates 86 are inserted into the supporting plate receivers 85 so that the upper flange 2 is positively secured to the outer wall 5' in the similar manner as in the case of the lower flange 4. On the other hand, the notches 81, 81 formed in the upper wall portion of the outer wall 5' around the hole 41 are in alignment with the notches 81, 81 formed around the hole 42 in the lower wall portion of the outer wall 5', and the projections 84, 84 in each of the upper and lower flanges 2, 4 are adapted to be fitted in the notches 81, 81 in the upper and lower wall portions of the outer wall 51. Therefore, there are three cases in which the projections 84, 84 coincide with the notches 81, 81, i.e. (a) both the upper and lower cylindrical membranes 1a, 1b are not twisted, (b) either one of the cylindrical membranes 1a, 1b is twisted by 180°, and (c) both the cylindrical membranes 1a, 1b are twisted. The conditions (a), (b) and (c) are clearly distinguished from each other by observing the appearance of the cylindrical membranes 1a, 1b. Therefore, the mounting of the throttle valve 8 in the outer wall 5' is easily carried out by merely observing the state of the cylindrical membranes 1a, 1b in which either one of them is twisted and by fitting the projections 84, 84 in the corresponding notches 81, 81.

In order to easily detach the throttle valve 8 from the outer wall 5', one of the side wall portions of the outer wall 5' is made detachable from the remaining wall portions so that the supporting plates 86 are withdrawn from the supporting plate receivers 85 by the hands of the operator inserted through the side of the outer wall 5' at which the side wall portion is removed, thereby permitting the upper and lower flanges 2, 4 to be detached easily from the outer wall 5'. Therefore, it is not necessary to remove the entire outer wall 5' as is required in the prior art device. Further, since the throttle valve 8 can be detached without inserting the hands in the interior of the cylindrical membranes 1a, 1b, the operation is very sanitary.

As described above, the device of the present invention is very simple in construction, and the throttle valve 8 can be very easily and exactly attached to the outer wall 5'. Further, the operation for mounting the cylindrical membranes 1a, 1b with either one of them being twisted by 180° is made very simple and the operation for detaching the throttle valve 8 is also made very simple.

In the opening and closing device for the throttle valve 8 shown in FIGS. 14 to 29, a lever 6' made of a rigid material is connected to the drum 48 or 48' in order to rotate the same for operating the throttle valve 8. Therefore, if an excessive force over the force required to operate the throttle valve 8 is applied to the lever 6', the connecting pins of the lever 6' and the drum 48 or 48' might be broken, or failure might take place in the supporting portion of the lever 6', or the wire engaging with the drum 48 or 48' might be tensioned too tightly thereby resulting in damage to the device.

In order to improve the device so as to avoid the above disadvantages, in the embodiment shown in FIG. 41, a portion or the entirety of the lever 6' is made of a resilient material having an appropriate hardness or rigidity. As shown in FIG. 41, a portion of the lever 6' is made a rigid body 88 while a portion of the lever 6' adjacent to the upper end thereof is made a resilient body 89. However, the lever 6' is not to be limited to that shown in the drawing having a portion formed by the resilient body 87 but it may be made a lever constructed entirely by a resilient material. In this case, it is preferred to gradually increase the width or thickness of the lever toward the connecting portion thereof to the drum 48'. By making the lever 6' by the resilient material, even though an excessive force is applied to the lever 6', the force is absorbed by the material constituting the lever 6' thereby positively preventing excessive force from being applied to the connecting portion of the lever 6' to the drum 48' or to the supporting portion 104 of the lever 6' or to the wire engaging with the drum 48', so that damage to the device is positively avoided.

The embodiment illustrated in FIGS. 42, 43, 44A and 44B is directed to remove the disadvantages of the device of FIG. 24. In the embodiment of FIG. 24, it is hardly possible to make at all times constant the resultant length of the distance between the securing points of the wires 50, 51 to the outer wall 5' and the running blocks 52', 53' and the distance between the running blocks 52', 53' and the securing points on the central flange 3 of the wires 50, 51. Therefore, either one of the wires 50, 51 is necessarily slackened when the throttle valve 8 is operated thereby resulting in the danger of disengagement of the wires 50, 51 from the running blocks 52, 53. In other words, as shown in FIG. 24, when either one of the wires 50, 51 is pulled toward the drum 48', the wire which is pulled toward the drum 48' (the wire 50 in FIG. 24) is fully tensioned while the other wire is slackened.

In order to avoid the above disadvantages, the embodiment shown in FIGS. 42 to 44 includes springs 94, 95 associated with the wires 50, 51, respectively, so that any slackening of the wires 50, 51, if occurring, is absorbed by the springs 94, 95 as shown in FIG. 43.

As shown in FIGS. 44A and 44B the standing blocks 62, 63 are located adjacent to the opposite ends of the intersecting line of the lower wall portion and the rear wall portion of the outer wall 5', and the standing blocks 64, 65 are located adjacent to the opposite ends of the intersecting line of the upper wall portion and one of the side wall portion of the outer wall 5', while the standing blocks 66, 67 are located adjacent to the opposite ends of the intersecting line of the front wall portion and the rear wall portion of the outer wall 5'. Standing blocks 90, 91 are secured at appropriate points adjacent to the intersecting line of the above one side wall portion and the rear wall portion of the outer wall portion 5'. Running blocks 52', 53' are secured respectively to a portion of the wire 49 between the standing blocks 62, 63 and a portion of the wire 49 between the standing blocks 65, 66, so that they are moved together with the wires 49. One end of the wire 49 is secured to the drum 48' and the wire 49 extends around the drum 48' and along the edge line of the outer wall 5' around the standing blocks 62, 63, 64, 65, 66 and 67 and is again returned to the drum 48' and terminates thereat where the other end of the wire 49 is secured thereto. The wires 50, 51 are made of a material such as stainless steel and the like. The wires 50, 51 are secured at their one ends to wire fixtures 92, 93 fixedly secured to the above one side wall portion of the outer wall 5'. The wire 50 extends around the standing block 90 and the running block 52' and toward and around the central flange 3 of the throttle valve 8 and terminates thereat where the other end of the wire 50 is secured to the central flange 3. In the similar manner, the wire 51 extends around the standing block 91 and the running block 53' and toward and around the central flange 3 of the throttle valve 8 and terminates thereat where the other end of the wire 51 is secured to the central flange 3. The springs 94, 95 are secured at their one ends to the eyes or the rings 96, 97 secured to the wires 50, 51 at appropriate positions thereon, respectively, while the other ends of the springs 94, 95 are secured to the wire fixtures 92, 93, respectively. As shown in FIG. 43, the springs 94, 95 are arranged in parallel to each other. The rings 96, 97 are so located on the wires 50, 51 that any slackening of the wires is appropriately absorbed by the springs. Therefore, when the elongation either of the spring 94 or 95 is made to the maximum, the portion of either of the wire 50 or 51 between the wire fixture 92 or 93 and the ring 96 or 97 is fully tensioned, while, when the elongation of either of the spring 94 or 95 is made to the minimum, the portion of the wire 50 or 51 between the wire fixture 92 or 93 and the ring 96 or 97 is slackened as viewed in FIG. 43.

On the other hand, the portion of the wire 50 or 51 between the ring 96 or 97 and the central flange 3 of the throttle valve 8 is at all times held in tensioned state by the action of the spring 94 or 95, thereby positively preventing the slackening of the wire 50 or 51 during the operation of the throttle valve 8 which slackening will occur in the embodiment of FIG. 24. Thus the slackening of the wires 50, 51 during the operation of the throttle valve 8 is completely absorbed by the springs 94, 95.

The embodiment shown in FIGS. 45 to 47 and FIGS. 48A, 48B, 48C, 48D and 48E is directed to improvement in the mounting device of the throttle valve. In this embodiment, the opposite ends of the upper cylindrical membrane 1a can be easily and properly attached to the upper flange 2 and the central flange 3 while the opposite ends of the lower cylindrical membrane 1b can be easily and properly attached to the central flange 3' and the lower flange 4. As shown in the drawings, the upper flange 2, the central flange 3, 3' and the lower flange 4 include annular upstanding portions 98 formed in the inner periphery of the flanges, respectively. The outer periphery each of the central flanges 3, 3' is in an eliptical shape having a mirror diameter slightly smaller than the inner diameter of the upper and lower flanges 2, 4 and a major diameter substantially equal to the outer diameter each of the upper and lower flanges 2, 4. As previously described, the upper and lower cylindrical membranes 1a, 1b are made of a resilient material such as rubber and the like and the thickness is preferably thin. The inner diameter each of the cylindrical membranes 1a, 1b is made substantially equal to the outer diameter each of the annular upstanding portions 98 of the upper flange 2, the central flanges 3, 3' and the lower flanges 4. The thickness of the annular upstanding portions 98 are preferably as thin as possible.

Figure 48A:
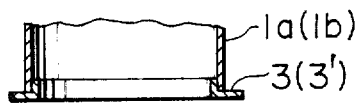
FIGS. 48A, 48B, 48C, 48D and 48E are longitudinal sectional views showing respectively main parts of the device of FIG. 45.
Figure 48B:
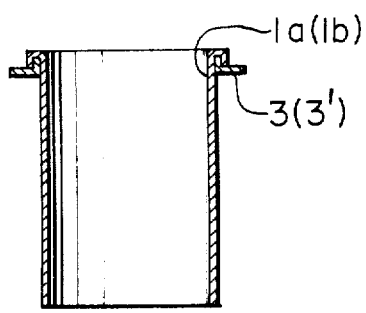
Figure 48C:
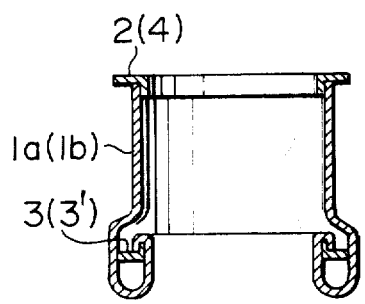
Figure 48D:
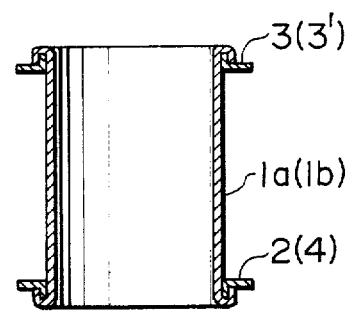
Figure 48E:
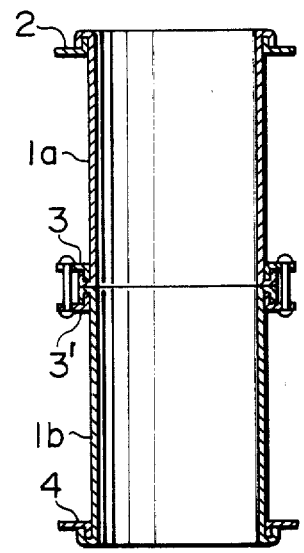

The upstanding portion 98 of the central flange 3 is inserted into the interior of the lower end of the upper cylindrical membrane 1a, and the inner surface of the lower end of the upper cylindrical membrane 1a is secured to the outer surface of the upstanding portion 98 by means such as a bonding agent (FIG. 48A). Then, as shown in FIG. 48B, the upper cylindrical membrane 1a is folded back into the opening of the central flange 3 so that the other end of the membrane 1a is directed in the opposite direction to the direction to which the free end of the upstanding portion 98 is directed. Thereafter, the other end of the membrane 1a is expanded and again folded back around the central flange 3 so as to envelop the same as shown in FIG. 48C. Thereafter, the upstanding portion 98 of the upper flange 2 is inserted in the inner surface of the other end of the upper cylindrical membrane 1a and secured thereto by means such as a bonding agent. Finally, the central flange 3 is positioned substantially vertically so that it is passed through the upper flange 2 and then the central flange 3 is turned to the horizontal position. Thus, as shown in FIG. 48D, each of the ends of the upper cylindrical membrane 1a are folded back upon itself or formed in the U-shape in cross-section, so that the upper cylindrical membrane 1a is firmly secured to the upper flange 2 and the central flange 3, respectively. In the similar manner, the lower cylindrical membrane 1b is firmly secured to the central flange 3' and the lower flange 4. Then, the central flange 3 is secured to the central flange 3' by means such as bolts so that a throttle valve 8 is formed by twisting either one of the cylindrical membrane 1a or 1b by 180° for closing the same. By such procedures, since the ends of each of the cylindrical membranes 1a, 1b are secured to the corresponding flanges by folding back the ends so as to form the U-shape in crosssection, the firm securing of the membranes 1a, 1b to the respective flanges 2, 3, 3' and 4 is insured. Further, since the securing of the membranes 1a, 1b to the respective flanges 2, 3, 3' 4 is achieved by merely inserting the upstanding portions 98 of the flanges into the inner surfaces of the ends of the membranes 1a, 1b and by bonding them together by means such as a bonding agent, the mounting operation is made far easier than in the case in which the ends of the membranes 1a, 1b are first folded back upon themselves to form a U-shape in cross-section so as to be bonded to the respective flanges.

Figure 49:
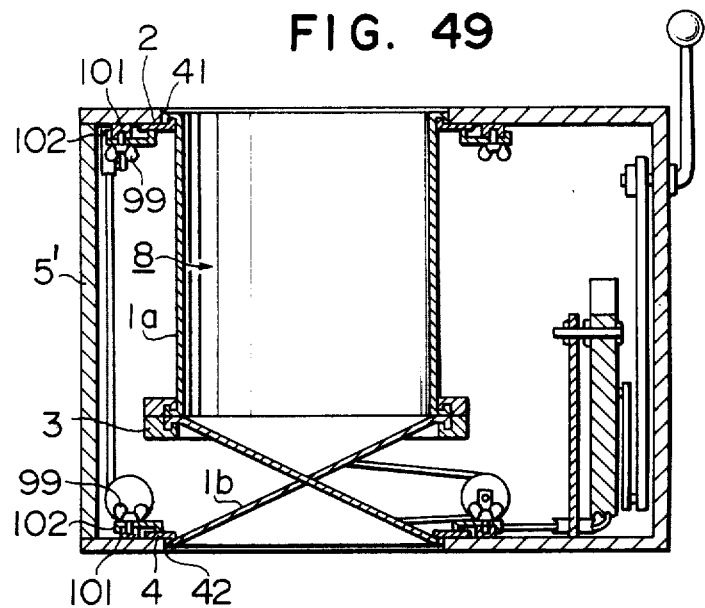
FIG. 49 is a longitudinal sectional view showing a further embodiment of the mounting device of the throttle valve of the odorless lavatory device of the present invention.
Figure 50:
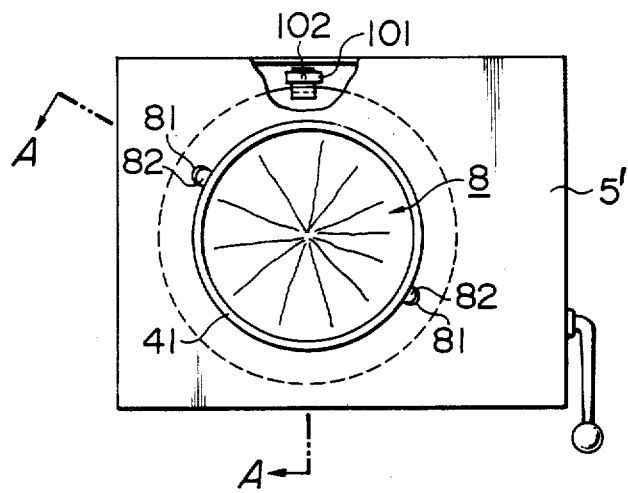
FIG. 50 is a plan view of FIG. 49.
Figure 51:
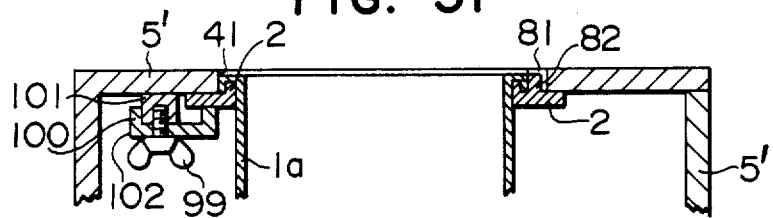
FIG. 51 is an enlarged sectional view taken along line A—A in FIG. 50 showing the main parts of the mounting device of FIG. 49.

The embodiment illustrated in FIGS. 49 to 51 is directed to a further improvement in the mounting device of the throttle valve in the odorless lavatory device of the present invention. In other words, it is directed to an improvement in securing the upper and lower flanges 2, 4 to the holes 41, 42 of the outer wall 5', respectively.

In the drawings, supporting plate fixtures 101 are secured adjacent to the holes 41, 42 in the upper and lower wall portions of the outer wall 5' and the supporting plates 102 are formed with upstanding portions or bent portions 100 at the opposite ends thereof so as to be formed in the U-shape. The supporting plates 102 are adapted to be secured to the fixtures 101 by means of thumbscrews 99 for supporting the corresponding flanges of the cylindrical membranes 1a, 1b.

In mounting the cylindrical membranes 1a, 1b in the outer wall 5', the upper and lower cylindrical membranes 1a, 1b are folded together, i.e., the upper flange 2, the control flange 3 and the lower flange 4 are superposed upon each other, and are located between the holes 41, 42, and then the projections 82, 82 of the lower flange 4 are fitted in the notches 81, 81 of the hold 42. Thereafter, the supporting plates 102 are secured by the thumbscrews 99 to the supporting plate fixtures 101 at the lower wall portion of the outer wall 5' with the free ends of the upstanding portions 100 of the supporting plates 102 being directed to the lower flange 4. Thus, the lower flange 4 is firmly clamped by the supporting plates 102 and the lower wall portion of the outer wall 5' while the rotation of the lower flange 4 is prevented by the engagement of the projections 82, 82 with the notches 81, 81. Therefore, the lower flange 4 is firmly secured to the hole 42 of the outer wall 5'. In securing the supporting plates 102 to the fixtures 101 by the thumbscrews 99, since the upstanding portions 100 of the supporting plates 102 abut against the fixtures 101, the supporting plates 102 are prevented from rotating together with the thumbscrews 99, thereby greatly facilitating the tightening of the thumbscrews 99.

After the lower flange 4 has been secured to the hole 42, the central flange 3 and the upper flange 2 are rotated together by 180° and the upper flange 2 is secured to the hole 41 of the outer wall 5' in the similar manner to the mounting of the lower flange 4 in the hole 42. In this case, the projections 82, 82 of the upper flange 2 are fitted in the notches 81, 81 of the hole 41. Thus, the mounting of the upper and lower flanges 2, 4 of the throttle valve 8 in the outer wall 5' can be carried out very easily and accurately. Further, the supporting plates 102 are prevented from rotating during the tightening of the thumbscrews 99, thereby insuring the supporting plates 102 to be easily and accurately secured in positions.

What is claimed is:

1. Apparatus for deodorizing a lavatory of the type including a lavatory bowl having an outlet port which communicates with excrement reservoir comprising a valve including first and second coaxial cylindrical membranes having equal inner diameters and equal lengths, each of said membranes having respective corresponding first and second opposite ends, a first flange secured to said first end of said first membrane, a third flange secured to said second end of said second membrane, a second flange commonly secured to said second end of said first membrane and said first end of said second membrane, said first and second membranes being reciprocably angularly displaceable about their common longitudinal axis by 180° relative to each other without elastically deforming either of said membranes, and a first sleeve having first and second opposite ends, said opposite ends of said first sleeve having respective first and second registerable apertures therein, said valve being mounted in said first sleeve, said first flange and said third flange of said valve respectively underlying and overlying said apertures in said first sleeve so as to permit said valve to isolate an odorous material from said first membrane of said valve.

2. The apparatus as claimed in claim 1, including a first lever mounted on said second flange and extending exteriorly thereof, said first sleeve being movable between first and second positions, said first sleeve including a helical slot said configuration of which is adapted to correspond with the movement of said lever through said first and second positions thereof so as to provide a throttle action for said valve, said valve being mountable on a lavatory bowl with said upper flange thereof being connectable to said outlet port thereof, said first end of said sleeve being correspondingly connectable to said lavatory bowl, said second end of said sleeve being positioned relative to said excrement reservoir, whereby said valve underlies said lavatory bowl and communicates with the interior thereof for thereby manifestly preventing the rise of odors from said excrement reservoir into the ambience of said lavatory bowl.

3. The apparatus as claimed in claim 2 including guide means mounted around said second end of said sleeve, a second sleeve having first and second opposite ends, said second sleeve being concentrically arranged relative to said first sleeve, said second end of said second sleeve being mounted on said guide, said second sleeve being rotatable on its mounting, an external gear mounted on said first end of said second sleeve, said external gear facing towards said second end of said second sleeve, a bearing member mounted on said guide in relative parallel relationship to said external gear, a first gear rotatably mounted on said external gear, a first gear rotatably mounted on said bearing member in mesh with said external gear, a second gear integrally and coaxially arranged relative to said first gear, said first gear being larger than said second gear, a rack mounted in mesh with said second gear, and a lever operatively connected to said rack, said lever being reciprocable between first and second positions for thereby rotating the gearing and throttling of said valve and preventing the rise of odors from said excrement reservoir into the ambience of said lavatory bowl.

4. The apparatus as claimed in claim 2 including a thrust bearing mounted on said second flange in spaced relationship to said first lever extending exteriorly of said second flange through said slot in said sleeve, a collar, a first sector link having first and second ends respectively universally mounted on said lever and said collar, a second sector link having first and second ends respectively pivotably connected to said thrust bearing and said collar, and a member slidably mounted in said collar between first and second positions, said lever and said thrust bearing being correspondingly oppositely reciprocably movable by 90° each relative to each other through said slot as said member is moved between its first and second positions, so as to throttle said valve for segregating odorous material from said lavatory bowl.

5. The apparatus as claimed in claim 1 including means for throttling said valve comprising first, second, third and fourth members mounted around said valve in upstanding spaced relationship relative thereto, said members being arranged between said valve and said first sleeve, a drum rotatably mounted between said third and fourth members, a first attach means tautly wound around said drum having first and second ends, said first end thereof slidably abutting against said fourth member and extending towards said first member, a first running block connected to said first end of said first attach means, said second end of said first attach means slidably abutting against said third member and extending towards said second member, a second running block connected to said second end of said first attach means, second and third attach means having respective first and second ends, said respective first ends thereof being fixedly connected to said sleeve, said second and third attach means being respectively correspondingly operatively connected to said first and second running blocks, said second respective ends thereof being correspondingly connected to said second flange, and means mounted on said drum for reciprocably rotating said drum between first and second positions for throttling said valve whereby odors are prevented from rising into the ambience of said lavatory bowl.

6. The apparatus as claimed in claim 1 including a means for throttling said valve comprising three respective pairs of rotatable runners, each runner laying in a plane perpendicular to the plane of the other runner in the pair, each plane of one runner in a pair intersecting at least two other planes of runners in corresponding pairs at substantially right angles, said valve being mounted within the geoform determined by the planes of said runners, a drum mounted in spaced relationship relative to said valve, a first attach means fixedly connected to said drum and slidably connected to each of said runners, first and second running blocks connected to said first attach means, and second and third attach means having first and second ends, said respective first ends thereof being correspondingly connected to said second flange, said respective second ends thereof being correspondingly connected to said sleeve for thereby throttling said valve as said drum is rotated for preventing odors from rising into the ambience of said lavatory bowl.

7. The apparatus as claimed in claim 6, said drum having a semicircular cross-section and an axis of rotation perpendicular to the axis of said valve, a lever reciprocable between first and second linear points, and means for translating the reciprocation of said lever into rotation of said drum for concomitantly rotating said second flange and thereby throttling said valve for segregating odorous material from said lavatory bowl.

8. The apparatus as claimed in claim 6, said fixed connection between respective first ends of said second and third attach means and said sleeve including biasing means having an end fixedly connected to said sleeve and an end biasingly connected to corresponding second ends of said respective second and third attach means for thereby tensioning said first, second and third attach means on said runners and running blocks as said drum is rotated between a first and second position.

9. The apparatus as claimed in claim 1 including means for throttling said valve mounted between said valve and said first sleeve, said first sleeve comprising an expanded housing, said first and second registerable apertures in said first sleeve having respective diameters greater than the corresponding inner diameters of said first and third flanges, but said first and second registerable apertures in said first sleeve having respective diameters lesser than the corresponding outer diameters of said first and third flanges, said first and second registerable apertures, respectively, having a pair of diametrically opposite notches in the perimeter thereof, each of said notches having a length exceeding the outer diameter of said first and third flanges, respectively.

10. The apparatus as claimed in claim 9, said first and third flanges including respective pairs of diametrically opposite hubs correspondingly engageable in said pairs of notches in said first and second registerable apertures in said first sleeve.

11. The apparatus as claimed in claim 1 including means for throttling said valve mounted within said first sleeve, said first sleeve comprising an expanded housing, said first and third flanges having a generally circular interior perimeter and a generally elliptical outer perimeter, said first and second registerable apertures in said first sleeve having a diameter greater than the length of a corresponding chord through opposite points on the outer perimeter of said first and third flanges, but lesser than a major diameter through opposite points on said outer perimeter of said first and third flanges.

12. The apparatus as claimed in claim 10 including at least one bearing member mounted within said expanded housing proximate each of said first and second registerable apertures therein, and a corresponding tongue mounted on each of said first and third flanges releasably engageable in a corresponding bearing member.

13. The apparatus as claimed in claim 1, said first and third flanges comprising an annular ring and a lip depending therefrom at substantially right angles thereto, and a second flange comprising a composite mirror image of said first and third flanges, said depending lip of said second flange having an ellipsoidal perimeter, and means for releasably connecting said mirror image composite in releasably fixed mirror image relationship, each of said cylindrical membranes being connected to a member of said mirror image composite and substantially surrounding said respective corresponding member of said mirror image composite.

* * * * *